United States Patent
Shimoda et al.

(10) Patent No.: US 8,130,612 B2
(45) Date of Patent: Mar. 6, 2012

(54) RECORDING DEVICE, RECORDING METHOD, AND COMPUTER PROGRAM

(75) Inventors: Daisuke Shimoda, Osaka (JP); Motoshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 542 days.

(21) Appl. No.: 12/376,500

(22) PCT Filed: Sep. 27, 2007

(86) PCT No.: PCT/JP2007/068775
§ 371 (c)(1),
(2), (4) Date: Feb. 5, 2009

(87) PCT Pub. No.: WO2008/038698
PCT Pub. Date: Apr. 3, 2008

(65) Prior Publication Data
US 2010/0177607 A1    Jul. 15, 2010

(30) Foreign Application Priority Data

Sep. 29, 2006  (JP) ................................. 2006-267626

(51) Int. Cl.
*G11B 7/00* (2006.01)
(52) U.S. Cl. .................. 369/53.15; 369/53.2; 369/47.14
(58) Field of Classification Search ............... 369/47.14, 369/53.15–63.17, 47.15, 275.3
See application file for complete search history.

(56) References Cited

U.S. PATENT DOCUMENTS 5,404,357 A    4/1995  Ito et al.
(Continued)

FOREIGN PATENT DOCUMENTS

| JP | 05-002837 | 1/1993 |
|----|-----------|--------|
| JP | 2005-276433 | 10/2005 |
| JP | 2006-85859 | 3/2006 |
| JP | 2006-114107 | 4/2006 |
| JP | 2006-525619 | 11/2006 |

OTHER PUBLICATIONS

International Search Report for corresponding Application No. PCT/JP2007/068775 mailed Dec. 18, 2007.

(Continued)

*Primary Examiner* — Thang Tran
(74) *Attorney, Agent, or Firm* — Renner, Otto, Boisselle & Sklar, LLP

(57) ABSTRACT

A recording apparatus which records information on a write once recording medium sequentially including a user data area, a first management information area, an indicator area and a second management information area on a recording layer thereof. The recording apparatus includes an optical head; and a control section for instructing the optical head to record information. The control section instructs to record management information in the first management information area; instructs to record indicator information indicating whether or not the management information has been recorded, in the indicator area; and instructs to record the same management information as recorded in the first management information area, in the second management information area.

7 Claims, 19 Drawing Sheets

U.S. PATENT DOCUMENTS

| | | | |
|---|---|---|---|
| 2004/0090888 A1* | 5/2004 | Park et al. | 369/47.14 |
| 2004/0218488 A1 | 11/2004 | Hwang et al. | |
| 2005/0030849 A1* | 2/2005 | Park | 369/47.14 |
| 2005/0169132 A1* | 8/2005 | Kuraoka et al. | 369/47.14 |
| 2005/0270946 A1* | 12/2005 | Kim | 369/53.17 |
| 2006/0044979 A1 | 3/2006 | Kuraoka et al. | |
| 2006/0087943 A1 | 4/2006 | Kuraoka et al. | |
| 2010/0226220 A1* | 9/2010 | Park | 369/47.15 |

OTHER PUBLICATIONS

White Paper, Blu-ray Disc Recordable Format, Part 1, Physical Specifications, Feb. 2006 (p. 3 of the description).

Notice of Reasons for Rejection for corresponding Japanese Application No. 2008-536417 (which is a Japanese National Phase application of PCT/JP2007/068775) dated Nov. 15, 2011.

* cited by examiner

RECORDING DEVICE, RECORDING METHOD, AND COMPUTER PROGRAM

TECHNICAL FIELD

The present invention relates to a recording apparatus and a recording method for recording information to a write once recording medium, and a reproduction apparatus and a reproduction method for reproducing information from a write once recording medium.

BACKGROUND ART

Optical discs are well known as information recording mediums exchangeable among a plurality of apparatuses. Optical discs are roughly categorized into three types, i.e., read-only type, write once type, and rewritable type. A write once optical disc allows data to be written only once at the same position thereof. For example, CD-R and DVD-R are write once optical discs. A rewritable optical disc allows data to be written many times at the same position thereof. For example, CD-RW and DVD-RAM are rewritable optical discs.

An optical disc is an exchangeable information recording medium, and therefore the surface thereof may be flawed or may have dust attached thereto, for example, at the time of, or during, exchange. A flaw or dust is treated as a defect existent on the recording layer. In order to guarantee the reliability of the information to be recorded or reproduced, defect management needs to be done.

As a conventional defect management method, Patent Document 1, for example, discloses the following. Two defect management information areas (defect management areas (DMAs)) are allocated at prescribed positions in an inner zone and prescribed positions in an outer zone (four areas in total) of a rewritable optical disc (for example, an DVD-RAM), and a DDS (Data Definition Structure) which defines the disc structure and a defect management list (Defect List) are recorded in these management information areas.

Conventionally, in order to enable information to be read from a write once optical disc by an optical disc reproduction apparatus (for example, a DVD player) usable for reading data only from a read-only optical disc, the write once optical disc needs to be subjected to finalize processing. The write once optical disc, when being finalized, obtains a data structure compatible with the data structure of the read-only optical disc. Such a write once optical disc is changed from a rewritable state into an un-rewritable state.

Recently, format establishment and development of Blu-ray discs, which are large capacity optical discs preferable for storing high quality video data such as high definition video data or the like, have been progressively conducted (for example, Non-patent Document 1). Strict defect management is applied to write once Blu-ray discs because these discs provide high quality and large capacity.

Considerations have been given to compatibility of write once Blu-ray discs with rewritable Blu-ray discs. The Blu-ray disc format is defined such that a write once Blu-ray disc, when being changed from a rewritable state into an un-rewritable state by finalization, obtains the same data arrangement and the same data structure of management information as those of a rewritable Blu-ray disc. Namely, a write once Blu-ray disc is finalized by recording of management information in a DMA area so as to have a data structure compatible with that of a rewritable Blu-ray disc and so as to be fixed to an un-rewritable state from a rewritable state.

FIG. 19 shows a structure of a conventional optical disc. An optical disc 21 has a spiral track groove 22 formed on a discus-shaped substrate. The track groove 22 has a plurality of blocks 23 formed therein. A block 23 is an error correction unit and is also a minimum unit for information recording and information reproduction.

The optical disc 21 includes a lead-in area 24, a user data area 25, and a lead-out area 26. User data is written to, or read from, the user data area 25.

The lead-in area 24 and the lead-out area 26 are redundant areas with a track groove, which are provided such that even if an optical head (not shown) accessing an end of the user data area 25 overruns, tracking is still possible. The lead-in area 24 and the lead-out area 26 are not permitted to be accessed by a user (for recording or reproduction at a prescribed address), but management data or the like may be written in one of, or both of, the lead-in area 24 and the lead-out area 26.

In the lead-in area 24, management information areas 28a and 28b, an indicator area 27, and a temporary management information area 29 are provided. In the management information areas 28a and 28b, management information for managing a recording state of the optical disc 21 is recorded. In the indicator area 27, indicator information which indicates whether or not the management information areas 28 and the temporary management information area 29 are in a recorded state.

In the lead-out area 26, a management information area 28c is provided. In the management information area 28c, management information for managing a recording state of the optical disc 21 is recorded.

FIG. 20 shows a data structure of a conventional write once disc. At the left end of FIG. 20, the indicator area 27, the management information areas 28a through 28c, and the temporary management information area 29 described above with reference to FIG. 19 are shown.

The indicator area 27 includes an access indicator 27a. The access indicator 27a includes DMA recorded-state information 35 and TDMA recorded-state information 36. The DMA recorded-state information 35 is a copy 39 of a DDS 37 to be recorded in a DMA1 area 31.

In the management information areas 28a through 28c, the DMA1 area 31, a DMA2 area 32, a DMA3 area 33 and a DMA4 area 34 in which management information is to be recorded during finalize processing are located discretely. In each area, disc management information (DDS 37 and DFL 38) is recorded.

In one DMA area, the DFL 38 is multiple-recorded with the same content. The DDS 37 has DFL recording position information 40. The DFL recording position information 40 indicates a recording position at which the DFL 48 can be normally reproduced.

The temporary management information area 29 has a TDMA area 30 for temporarily recording management information until finalization. In the TDMA area 30, a newer and newer DDS 37 and a newer and newer DFL 38 are recorded in an additive manner.

FIG. 7 is a flowchart showing an example of a procedure for acquiring management information. A conventional optical disc apparatus, when an optical disc is mounted thereon, acquires the access indicator 27a (step 401) and determines a target area from which the management information is to be acquired (step 402).

When the DMA recorded-state information 35 is not recorded and the TDMA recorded-state information 36 is recorded, the optical disc apparatus performs acquisition processing of the management information from the TDMA area

36 (step 403). When the management information can be acquired from the TDMA 30, the optical disc apparatus determines that the mounted optical disc is a finalized disc (step 405). When the management information cannot be acquired, the optical disc apparatus determines that the mounted optical disc is an abnormal disc (step 406).

By contrast, when the DMA recorded-state information 35 is recorded, the optical disc apparatus performs acquisition processing of the management information from the DMA area (DMA1 area 31 through DMA4 area 34) (step 407). When the management information can be acquired, the optical disc apparatus determines that the mounted optical disc is a finalized disc (step 409). When the management information cannot be acquired, the optical disc apparatus determines that the mounted optical disc is an abnormal disc (step 406).

Now, finalize processing will be described. The following procedure for finalize processing will not be described as a procedure actually executed by existing optical disc apparatuses, but as an example of conceivable processing.

FIG. 8 and FIG. 10 are flowcharts each showing an example of a procedure of the finalize processing.

The conventional optical disc apparatus executes the finalize processing upon receiving a finalization instruction from an upper-level control apparatus. The finalize processing for an optical disc is implemented by step (A) of recording management information in the DMA1 area 31 through the DMA4 area 34 and step (B) of recording the access indicator 27*a* (DMA recorded-state information 35). For example, Patent Document 2 discloses such processing.

FIG. 8 is a flowchart showing a procedure of the finalize processing by which step (A) of recording management information in the DMA1 area 31 through the DMA4 area 34 is first executed, and then step (B) of recording the access indicator 27*a* is executed.

FIG. 9 shows a recording state of the optical disc finalized by the recording method shown in FIG. 8. (a) through (f) of FIG. 9, which respectively correspond to (a) through (f) of FIG. 8, show the state of the optical disc at the respective time.

FIG. 10 is a flowchart showing a procedure of the finalize processing by which step (B) of recording the access indicator 27*a* is first executed, and then step (A) of recording management information in the DMA1 area 31 through the DMA4 area 34 is executed.

Patent Document 1: Japanese Laid-Open Patent Publication No. 5-2837
Patent Document 2: Japanese Laid-Open Patent Publication No. 2005-276433
Non-patent Document 1: White Paper BD-R Physical Specifications, February 2006 (URL: http://www.blu-raydisc.com/assets/downloadablefile/BD-R_Physical_3rd_edition_0602f1-13322.pdf)

DISCLOSURE OF THE INVENTION

Problems to be Solved by the Invention

However, if the recording in the DMA area is failed during the finalize processing shown in FIG. 8 or FIG. 10 due to an accidental power interruption or the like, an optical disc, from which management information in the DMA area cannot be reproduced, or an optical disc not conformed to the format with no (or low) reproduction compatibility, is created.

For example, it is assumed that an accidental power interruption or a serious write error occurs during the execution of the finalize processing shown in FIG. 8.

If the accidental power interruption occurs after step (A), i.e., after the recording in the DMA areas is completed, the optical disc is in the state of FIG. 9(*e*), namely, no information is recorded in the access indicator and the recording in the DMA areas is completed. The optical disc apparatus which has booted this optical disc determines that this is a non-finalized optical disc because the DMA recorded-state information 15 is not recorded. When this disc is re-finalized, there is an undesirable possibility that the DMA areas are entirely overwritten and the management information cannot be reproduced.

Now, it is assumed that recording of the DFL 38 in the DMA1 area 31 is failed during the execution of the finalize processing shown in FIG. 10.

The optical disc apparatus first records the access indicator 27*a* (step (B)). In this case, the optical disc apparatus performs the recording after setting the DMA recorded-state information 35 such that the DFL recording position information 40 indicates the leading position (DFL #1) of an area in the DMA1 area 31 in which the DFL 38 is to be recorded.

Next, the optical disc apparatus records the DFL 38 and the DDS 37 in the DMA1 area 31 (step (A)). In this case, the optical disc apparatus first records the DFL 38 in DFL #1 through DFL #7. Then, the optical disc apparatus records the DDS 37 after setting the DDS 37 such that the DFL recording position information 40 indicates the leading position at which the DFL 38 can be accurately reproduced. For example, when the recording in DFL #1 is failed and recording in DFL #2 is successful, the DFL recording position information 40 of the DDS 37 indicates DFL #2.

As described above, the content of the DFL recording position information 40 may be different between the DDS 37 in the DMA1 area 31 and the DMA recorded-state information 35 recorded in the access indicator area 29. In the case where the format defines that the DMA recorded-state information 35 in the access indicator area 29 should have the same content as that of the DDS 37 in the DMA1 area, this optical disc is not conformed to the format. As a result, an apparatus corresponding to the format cannot perform the processing and stops operating, which presents a problem of reducing the reproduction compatibility.

An object of the present invention is to create an optical disc which is recognized as a finalized disc even when an accidental power interruption or a serious write error occurs before the finalize processing is completed, and to provide a management information update apparatus and a management information update method capable of executing finalize processing which does not create an optical disc not conformed to the format with low reproduction compatibility.

Another object of the present invention is to provide a management information acquisition apparatus and a management information acquisition method capable of normally acquiring management information even from an optical disc for which update processing has not been completed due to a power interruption or the like occurring during information recording in a management information area.

Means for Solving the Problems

A recording apparatus according to the present invention records information on a write once recording medium sequentially including a user data area, a first management information area, an indicator area and a second management information area on a recording layer thereof. The recording apparatus includes an optical head; and a control section for instructing the optical head to record information. The control section instructs to record management information in the first management information area; instructs to record indicator information indicating whether or not the management information has been recorded, in the indicator area; and instructs to record the same management information as recorded in the first management information area, in the second management information area.

The write once recording medium may further have a temporary management information area to which latest management information is recordable in an additive manner; and when executing finalize processing on the recording medium, the control section may instruct to record the latest management information, recorded in the temporary management information area, in the first management information area and the second management information area.

The control section may instruct to further record in the indicator area a part of the information which is to be recorded in the management information.

The control section may instruct to further record in the indicator area, information indicating that the latest management information has been recorded in an additive manner in the temporary management information area.

The control section may instruct to record user data in the user data area, and then execute the finalize processing.

A recording method according to the present invention is performed to record information on a write once recording medium sequentially including a user data area, a first management information area, an indicator area and a second management information area on a recording layer thereof. The recording method includes the steps of (a) recording management information in the first management information area; (b) after the step (a), recording indicator information indicating whether or not the management information has been recorded, in the indicator area; and (c) after the step (b), recording the same management information as recorded in the first management information area in the second management information area.

A control circuit according to the present invention is incorporated into a recording apparatus including an optical head for instructing the optical head to record information on a write once recording medium. The recording medium sequentially includes a user data area, a first management information area, an indicator area and a second management information area on a recording layer thereof. The control circuit includes a recording control section for instructing the optical head to record management information; and a management information processing section for generating management information. The recording control section instructs the optical head to record management information generated by the management information processing section in the first management information area; to record indicator information indicating whether or not the management information has been recorded, in the indicator area; and to record the same management information as recorded in the first management information area in the second management information area.

A computer program according to the present invention is executed by a control circuit incorporated into a recording apparatus including an optical head and is used to control the optical head to record information on a write once recording medium. The recording medium sequentially includes a user data area, a first management information area, an indicator area and a second management information area on a recording layer thereof. The computer program causes the control circuit to execute the steps of (a) recording management information in the first management information area; (b) after the step (a), recording indicator information, indicating whether or not the management information has been recorded, in the indicator area; and (c) after the step (b), recording the same management information as recorded in the first management information area in the second management information area.

A first reproduction apparatus according to the present invention reproduces information from a write once recording medium sequentially including a user data area, a first management information area, an indicator area and a second management information area on a recording layer thereof. In the indicator area, indicator information is recorded which indicates whether or not management information is recorded in at least one of the first management information area and the second management information area. The reproduction apparatus includes an optical head; and a control section for instructing the optical head to reproduce information. Regardless of whether the indicator information is recorded in the indicator area, the control section instructs the optical head to access the management information areas, checks whether or not at least one of the management information areas has effective information, and when there is such effective information, instructs the optical head to read the effective information.

A second reproduction apparatus according to the present invention reproduces information from a write once recording medium including a temporary management information area and an indicator area on a recording layer thereof. The temporary management information area includes a first area and a second area in which latest management information is to be recorded in an additive manner. In the indicator area, indicator information is recorded which indicates whether or not management information is recorded in the temporary management information area. The reproduction apparatus includes an optical head; and a control section for instructing the optical head to reproduce information. When the indicator area indicates that the management information is recorded in the first area of the temporary management information area, the control section instructs the optical head to access the first area and also to the second area, determines whether or not at least one of the first area and the second area has effective information, and when there is such effective information, instructs the optical head to read the effective information.

EFFECTS OF THE INVENTION

According to the management information update method of the present invention, an access indicator is recorded while management information is recorded in DMAs discretely located on a recording medium. Therefore, even when the finalize processing is discontinued due to an accidental power interruption or the like occurring before the finalize processing is completed, an optical disc which is in the state of being bootable as a finalized disc or in the state of being bootable as a non-finalized disc so as to be re-finalized can be created.

According to the management information update method of the present invention, an access indicator is recorded after the recording in the DMA1 area is performed. Therefore, even when the recording of the DFL in the DMA1 area is failed and the DFL recording position information is changed, the same content of the DDS as recorded in the DMA1 area can be recorded in the indicator area. Hence, creation of an optical disc not conformed to the format with low reproduction compatibility can be avoided.

Especially after data write in the user data area is completed, recording is performed in the order of the DMA1 area, the access indicator and the DMA2 area. Such recording is sequentially performed from an inner position toward an outer position of the recording medium, or from an outer position toward an inner position. Accordingly, the optical head can keep on seeking in the same direction (for example, inward or outward), which can shorten the seek time and so the time required until the recording is completed.

According to the management information acquisition method of the present invention, it is checked whether or not effective information is recorded even in an area other than an area indicated as being in a recorded state by the access indicator (area recorded-state information). Therefore, management information can be normally acquired even from an optical disc subjected to a power interruption or the like during the management information update.

DESCRIPTION OF THE REFERENCE NUMERALS

Figure 1:
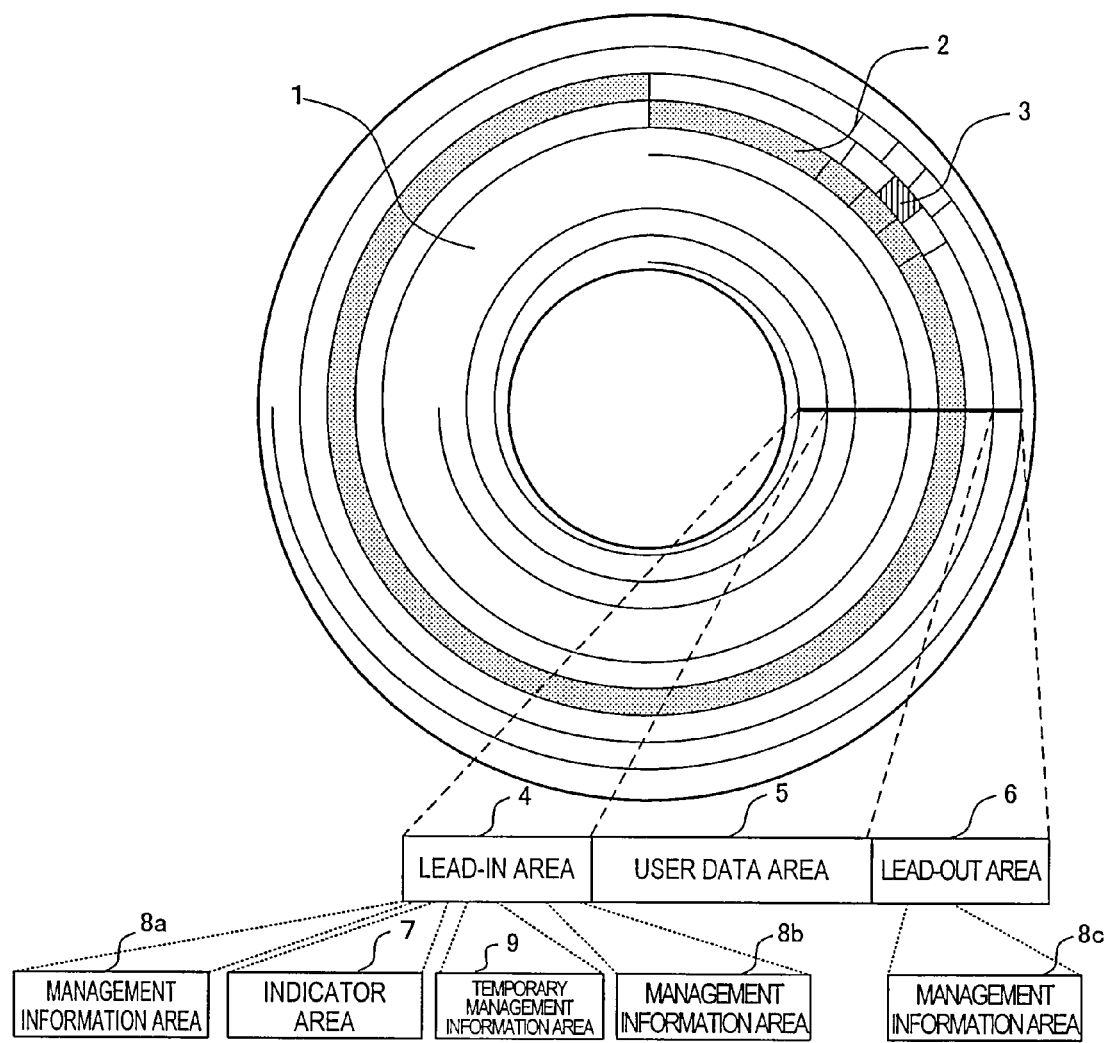
FIG. 1 shows a structure of an optical disc according to Embodiment 1 of the present invention.

100 Optical disc apparatus
110 Instruction processing section
120 Recording control section
130 Reproduction control section
140 Management information storage buffer
150 Data buffer
160 Management information processing section
161 Indicator reading section
162 Indicator writing section
163 Management information reading section
164 Management information writing section
165 Update processing control section
166 Acquisition processing control section
170 I/O bus

BEST MODE FOR CARRYING OUT THE INVENTION

Hereinafter, embodiments of an information recording apparatus and an information reproduction apparatus according to the present invention will be described with reference to the attached drawings.

In the embodiments described below, on an optical disc as a recording medium, four management information areas (DMA1 through DMA4) are discretely provided in a lead-in area and a lead-out area, and also an indicator area is provided. In addition, (a) the step of recording management information in the DMA1 area, (b) the step of recording indicator information, indicating whether or not the management information has been recorded, in the indicator area, and (c) the step of recording management information, having the same content as recorded in the DMA1 area, in other DMAs (DMA2 through DMA4) are sequentially executed. Hereinafter, the embodiments will be described in detail.

(Embodiment 1)
1-1. Write Once Recording Medium

Figure 19:
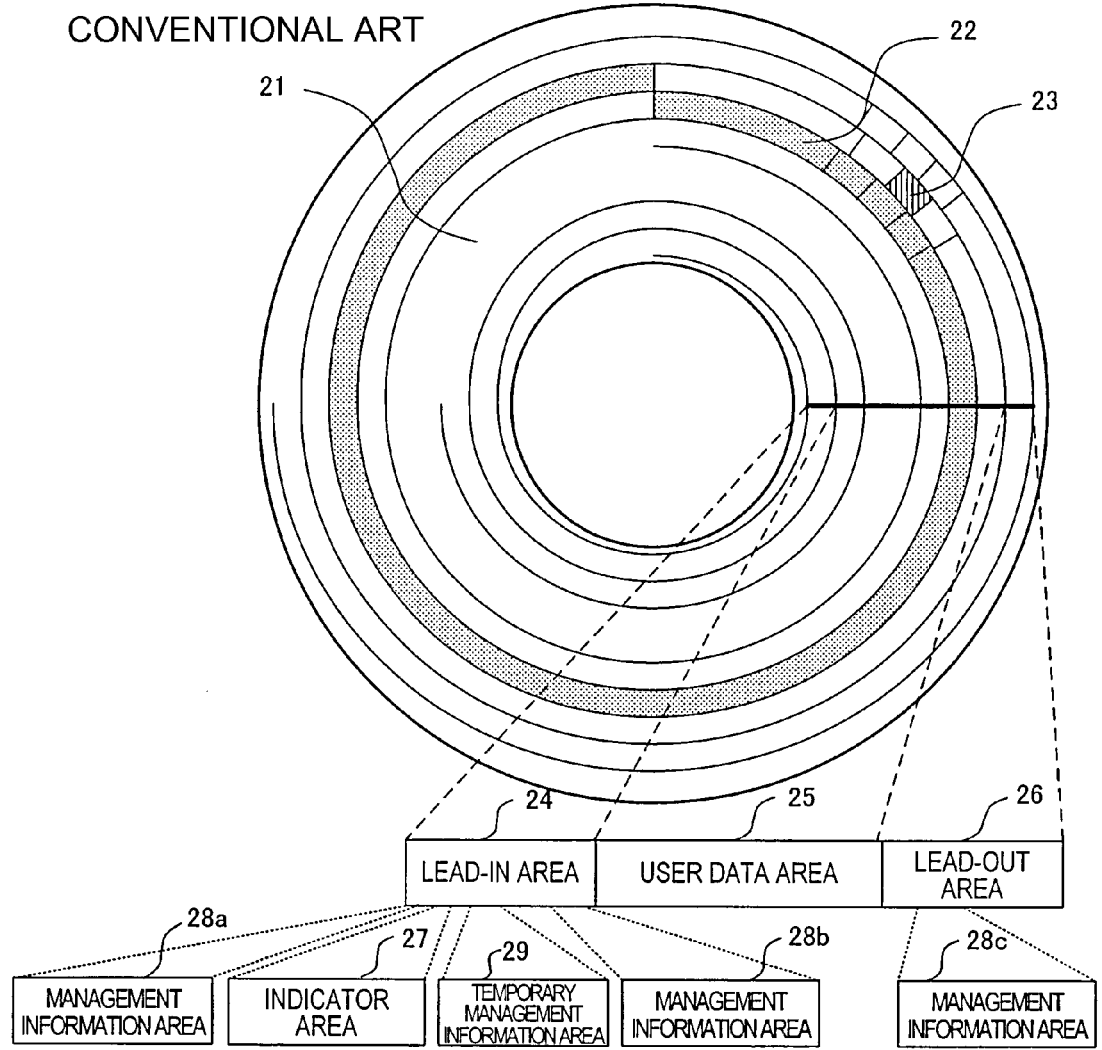
FIG. 19 shows a structure of a conventional optical disc.

FIG. 1 shows a structure of an optical disc 1 according to this embodiment. The optical disc 1 has an area structure equivalent to that of the conventional optical disc 21 shown in FIG. 19.

An optical disc 1 has a spiral track groove 2 formed on a discus-shaped substrate. The track groove 2 has a plurality of blocks 3 formed therein. A block 3 is an error correction unit and is also a minimum unit for information recording and information reproduction.

The optical disc 1 includes a lead-in area 4, a user data area 5, and a lead-out area 6. User data is written to, or read from, the user data area 5.

The lead-in area 4 and the lead-out area 6 are redundant areas with a track groove, which are provided such that even if an optical head (not shown) accessing an end of the user data area 5 overruns, tracking is still possible. These areas are not permitted to be accessed by a user (for recording or reproduction at a prescribed address), and management data or the like may be written in one of, or both of, these areas.

In the lead-in area 4, an indicator area 27, a management information area 8a, and a temporary management information area 9 are provided. In the management information area 8a and temporary management information area 9, management information for managing a recording state of the optical disc 1 is recorded. The temporary management information area 9 is used for temporarily recording the management information to be recorded in the management information area. In the indicator area 7, indicator information which indicates whether or not management information areas 8 and the temporary management information area 9 are in a recorded state.

In the lead-out area 6, a management information area 8c is provided, in which management information for managing a recording state of the optical disc 1 is recorded.

Figure 2:
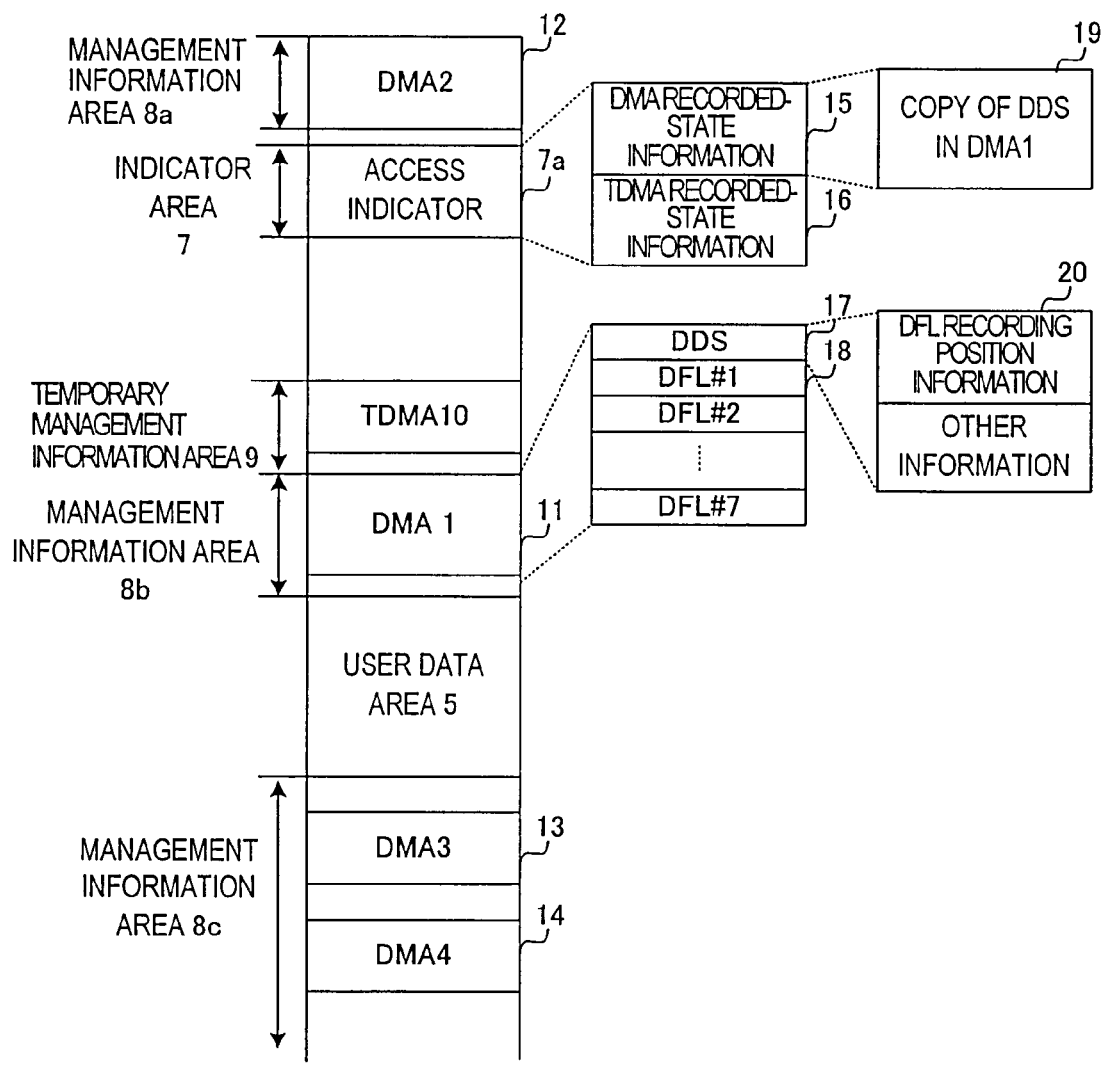
FIG. 2 shows a data structure of the optical disc according to Embodiment 1 of the present invention.
Figure 20:
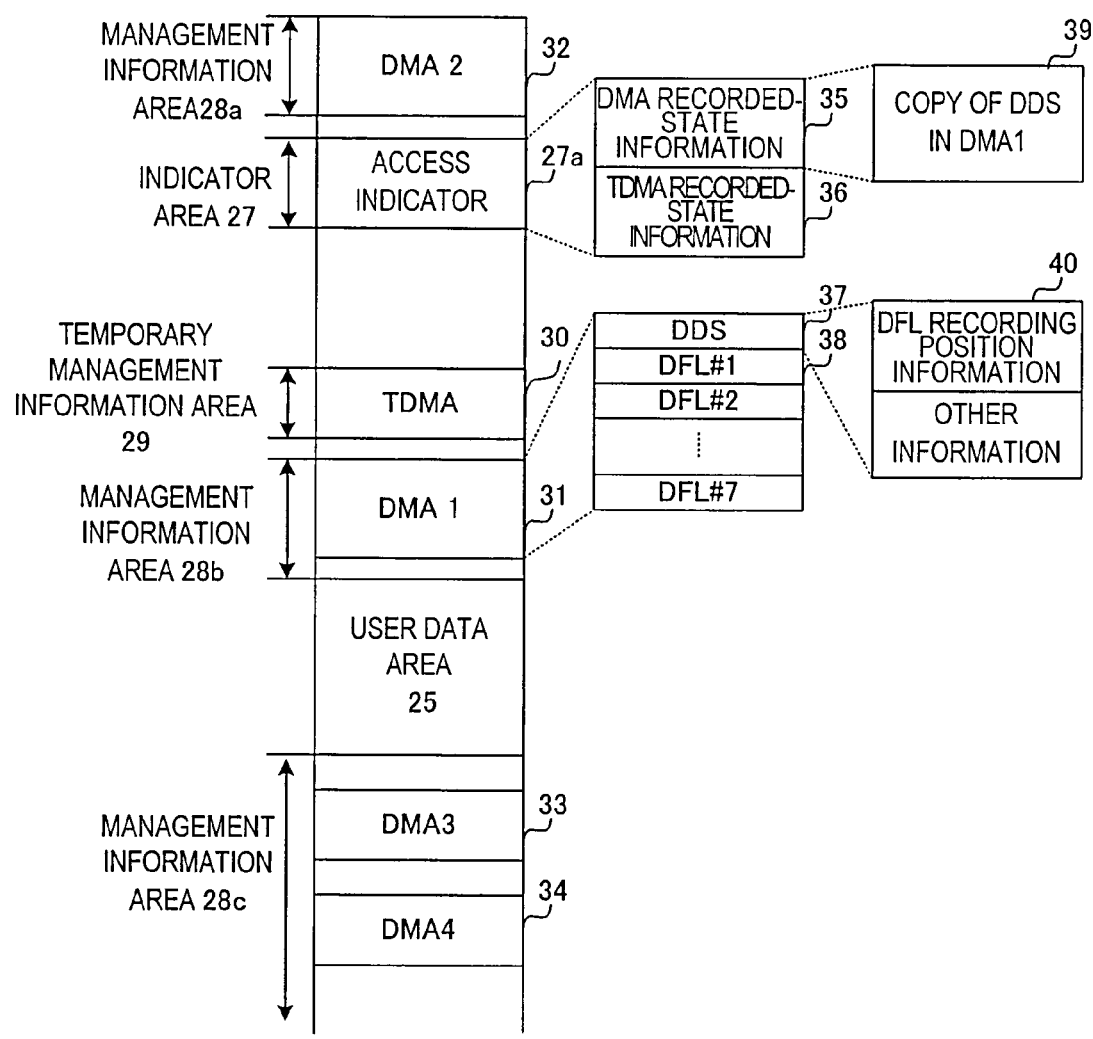
FIG. 20 shows a data structure of a conventional optical disc.

FIG. 2 shows a data structure of the optical disc 1 according to this embodiment. At the left end of FIG. 2, the indicator area 7, the management information areas 8a through 8c, and the temporary management information area 9 described above with reference to FIG. 1 are shown. The data structure of the optical disc 1 is equivalent to the conventional data structure shown in FIG. 20.

The indicator area 7 includes an access indicator 7a. The access indicator 7a includes DMA recorded-state information 15 and TDMA recorded-state information 16. The DMA recorded-state information 15 is a copy 19 of a DDS 17 to be recorded in a DMA1 area 11.

In the management information areas 8a through 8c, the DMA1 area 11, a DMA2 area 12, a DMA3 area 13 and a DMA4 area 14 in which management information is to be recorded during finalize processing are located discretely. In each area, disc management information (DDS 17 and DFL 18) is recorded.

In one DMA area, the DFL 18 is multiple-recorded with the same content. The DDS 17 has DFL recording position information 20. The DFL recording position information 20 indicates a recording position at which the DFL 18 can be normally reproduced.

The temporary management information area 9 has a TDMA area 10 for temporarily recording management information until the finalization. In the TDMA area 10, a newer and newer DDS 17 and a newer and newer DFL 18 are recorded in an additive manner.

Herein, the DMA1 area 11 through the DMA4 area 14 are collectively referred to as the "DMA area".

1-2. Recording and Reproduction Apparatus

Figure 3:
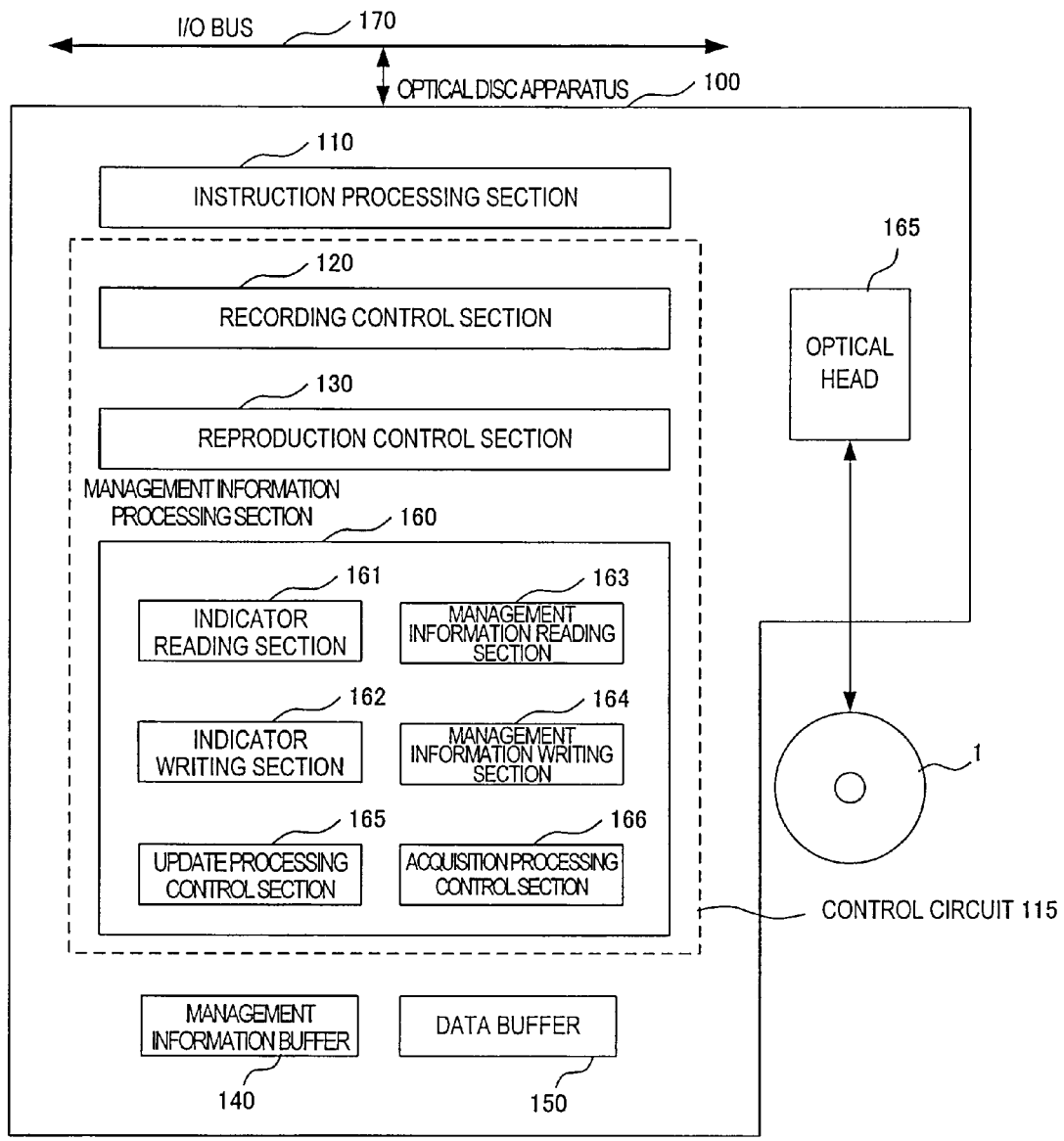
FIG. 3 shows a structure of an optical disc apparatus according to Embodiment 1 of the present invention.

FIG. 3 shows a structure of an optical disc apparatus 100 according to this embodiment.

The optical disc apparatus 100 is connected to an I/O bus 170, which is connected to an upper-level apparatus (not shown). The upper-level apparatus is typically a host computer.

The optical disc apparatus 100 is structured such that the optical disc 1 is mountable thereon. The optical disc apparatus 100 includes an instruction processing section 110, a control circuit 115, a management information buffer 140, a data buffer 150, and an optical head 165.

The instruction processing section 110 processes an instruction from the upper-level apparatus. The management information buffer 140 stores management information. The data buffer 150 temporarily stores recording data.

The control circuit 115 executes processing based on the instruction processed by the instruction processing section 110. For example, the control circuit 115 follows a reproduction instruction from the upper-level apparatus to drive the optical head 165 and thus to reproduce information from the optical disc 1. Or, the control circuit 115 follows a recording instruction from the upper-level apparatus to read information stored in the data buffer 150 and to drive the optical head 165 and thus to record the information on the optical disc 1. For example, based on an instruction from the control circuit 115, the optical head 165 records video information and/or audio information (so-called user data) in the user data area 5, records management information described later in the DMA area, and records the access indicator 7a in the indicator area 7.

The control circuit 115 executes various processing in accordance with instructions from the upper-level apparatus. This is realized by the control circuit 115 executing various computer programs pre-stored therein. The control circuit 115 is one circuit as viewed as hardware, but behaves like different elements by executing one or a plurality of computer programs.

Herein, the control circuit 115 is described as including various elements for executing main processing, for the simplicity of explanation. Specifically, the various elements are a recording control section 120 for controlling the recording of information to the optical disc 1, a reproduction control section 130 for controlling the reproduction of information from the optical disc 1, and management information processing section 160 for performing processing regarding management information.

For recording processing, various management information generated by the management information processing section 160 is stored in the management information buffer 140. The recording control section 120 instructs the optical head 165 to record the management information, stored in the management information buffer 140, in an appropriate area. In the case where user data is stored in the data buffer 150, the recording control section 120 instructs the optical head 165 to record the user data in the user data area 5.

For reproduction processing, based on an instruction from the reproduction control section 130, user data and management information are read and respectively stored in the data buffer 150 and the management information buffer 140. The management information processing section 160 reads and processes various management information stored in the management information buffer 140.

The management information processing section 160 can be considered as including more detailed elements each provided for a function. Specifically, the management information processing section 160 includes an indicator reading section 161, an indicator writing section 162, a management information reading section 163, a management information writing section 164, an update processing control section 165 for controlling management information update processing, and an acquisition processing control section 166 for controlling management information acquisition processing. The management information processing section 160 processes the management information by these functional blocks.

The indicator reading section 161 reads the DMA recorded-state information 15 and the TDMA recorded-state information 16 from the indicator area 7.

The indicator writing section 162 records the DMA recorded-state information 15 and the TDMA recorded-state information 16 in the indicator area 7.

The management information reading section 163 reads management information from the DMA1 area 11 through the DMA4 area 14 and the TDMA area 10 and stores the management information in the management information storage buffer 150.

The management information writing section 164 records management information stored in the management information buffer 140 in the DMA1 area 11 through the DMA4 area 14 and the TDMA area 10.

1-3. Management Information Update Method

A method for updating (recording) management information in the optical disc 1 according to this embodiment will be described. This processing is executed by the optical disc apparatus 100 described above.

Figure 4:
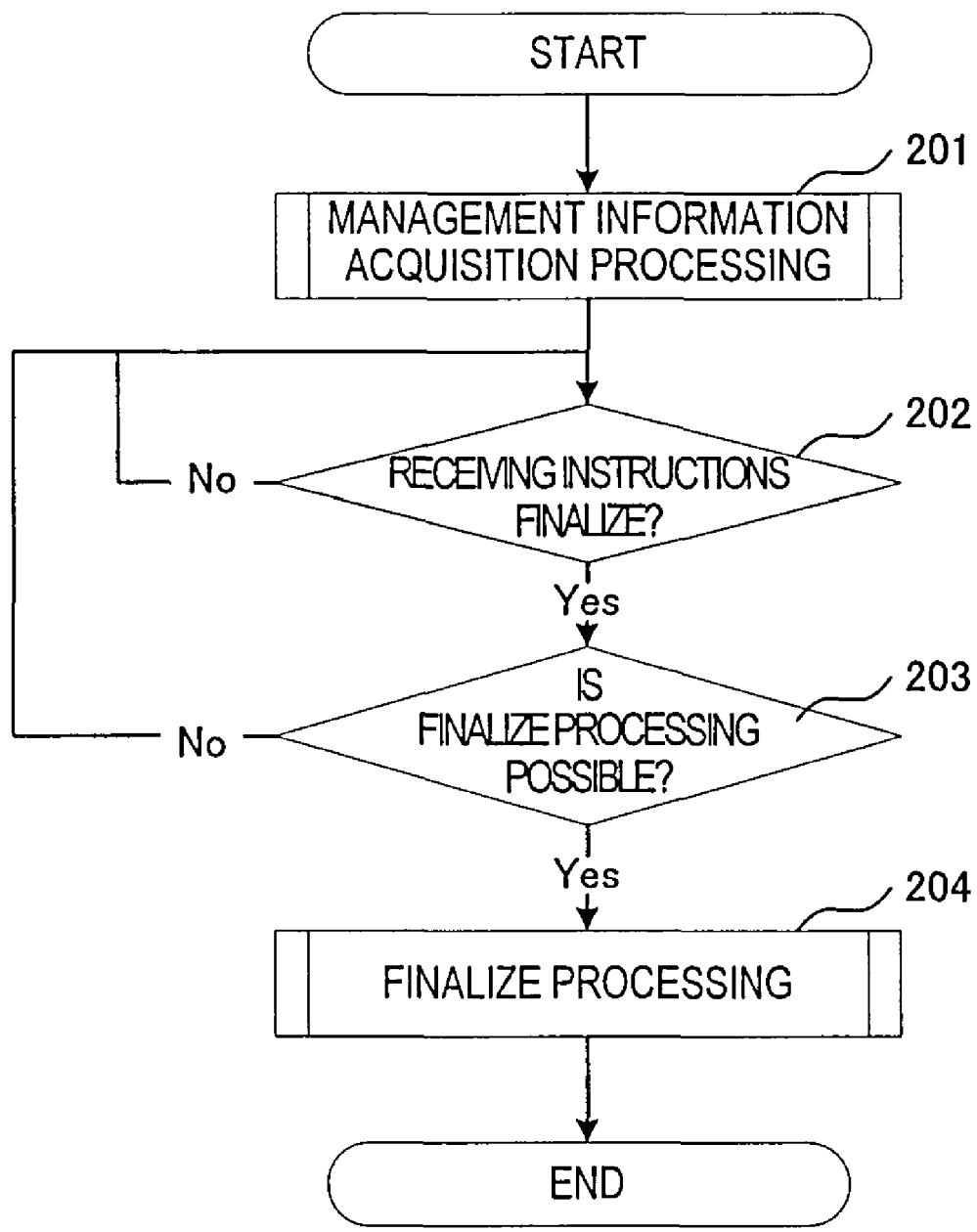
FIG. 4 is a flowchart showing a procedure of management information update processing according to Embodiment 1 of the present invention.

FIG. 4 is a flowchart showing a procedure of finalize processing according to this embodiment. In this embodiment, (a) the step of recording management information in DMA1, (b) step of recording indicator information, indicating whether or not the management information has been recorded, in the indicator area, and (c) recording management information, having the same content as recorded in the DMA1 area, in other DMAs (2 through 4) are sequentially performed.

Hereinafter, with reference to FIG. 3 and FIG. 4, a procedure of the finalize processing performed on a write once recording medium according to this embodiment will be described.

In step 201, when the optical disc 1 is mounted on the optical disc apparatus 100, the acquisition processing control section 166 causes the indicator reading section 161 and the management information reading section 163 to execute management information acquisition processing.

In step 202, the optical disc apparatus 100 receives an instruction for the optical disc 1 from the upper-level apparatus until the optical disc 1 is discharged from the optical disc apparatus 100 or the power is turned off. In the case where the instruction for the optical disc 1 is a finalize instruction, the processing advances to step 203.

In step 203, the update processing control section 165 determines whether or not the finalize processing can be performed on the optical disc 1. When the optical disc 1 is a non-finalized disc, the update processing control section 165 determines that the finalize processing can be performed on the optical disc 1, and the processing advances to step 204.

When the finalize processing can be performed on the optical disc 1, in step 204, the update processing control section 165 causes the indicator writing section 162 and the management information writing section 164 to execute the finalize processing.

Figure 5:
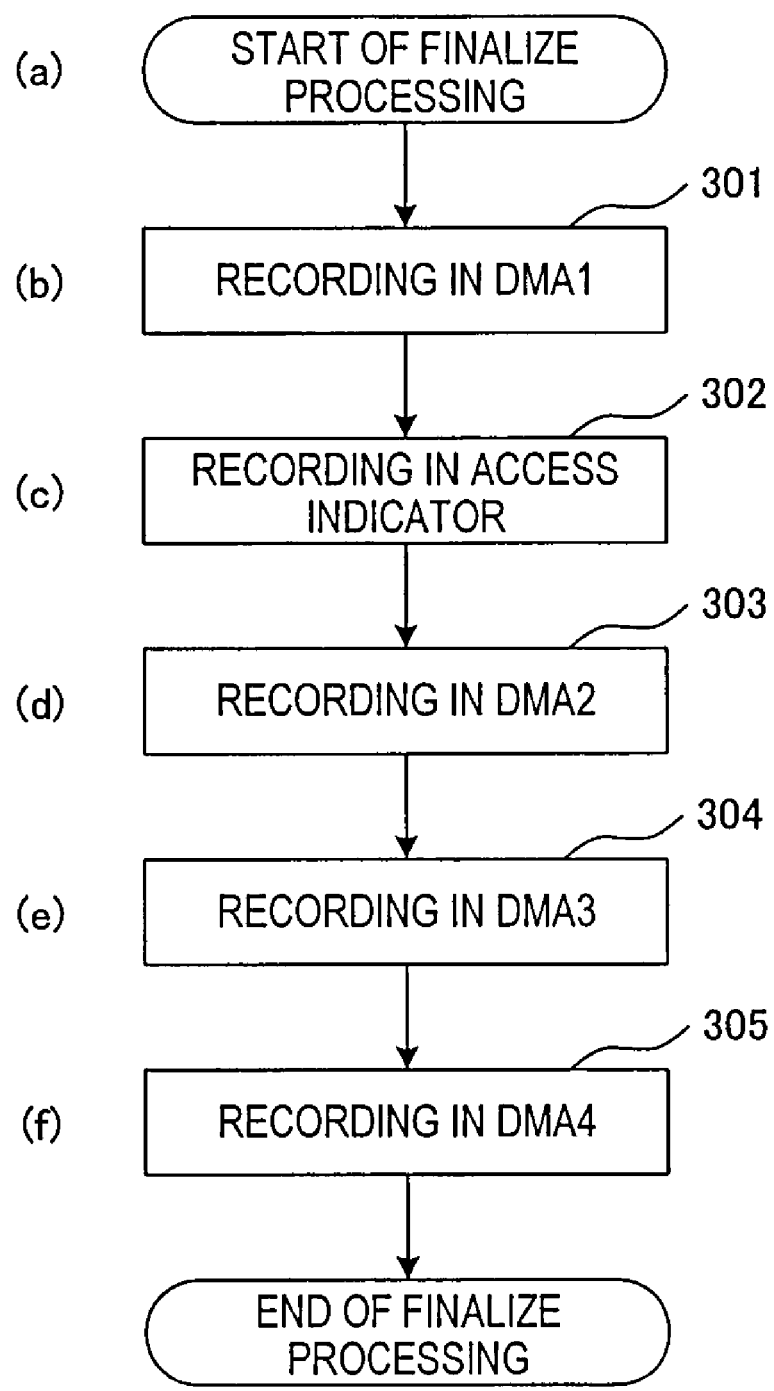
FIG. 5 is a flowchart showing a procedure of finalize processing according to Embodiment 1 of the present invention.

FIG. 5 is a flowchart showing a detailed procedure of the finalize processing (step 204 in FIG. 4) according to this embodiment. In this example, the finalize processing performed on a write once disc will be described.

The update processing control section 165 sends commands to cause the indicator writing section 162 and the management information writing section 164 in the procedure of steps 301 through 305 to execute the finalize processing.

In step 301, the update processing control section 165 sends a command to cause the management information writing section 164 to record the DFL 18 and the DDS 17 in the DMA1 area 11. After the DFL 18 is recorded, the DFL recording position information 20 is updated and then the DDS 17 is recorded.

In step 302, the update processing control section 165 sends a command to cause the indicator writing section 161 to record, in the indicator area 7, the same content as that of the DDS 17 recorded in the DMA1 area 11 in step 301.

In step 303, the update processing control section 165 sends a command to cause the management information writing section 164 to record the DFL 18 and the DDS 17 in the DMA2 area 12. After the DFL 18 is recorded, the DFL recording position information 20 is updated and then the DDS 17 is recorded.

In step 304, the update processing control section 165 sends a command to cause the management information writing section 164 to record the DFL 18 and the DDS 17 in the DMA3 area 13. After the DFL 18 is recorded, the DFL recording position information 20 is updated and then the DDS 17 is recorded.

In step 305, the update processing control section 165 sends a command to cause the management information writing section 164 to record the DFL 18 and the DDS 17 with updated DFL recording position information 20 in the DMA4 area 14. After the DFL 18 is recorded, the DFL recording position information 20 is updated and then the DDS 17 is recorded.

The finalize processing is executed in the above-described procedure. Thus, even when an accidental power interruption or the like occurs in any stage of the finalize processing, an optical disc which is in the state of being normally bootable as a finalized disc or in the state of being bootable as a non-finalized disc so as to be normally re-finalized can be created.

For example, when a power interruption occurs before the recording in the access indicator (step 302 in FIG. 5) is finished, the DMA recorded-state information 15 is not recorded in the access indicator. Therefore, the optical disc can be booted as a non-finalized disc. When being re-finalized, the optical disc can be normally booted as a finalized disc based on the information recorded in the indicator area 7 and the DMA2 area 12 through the DMA4 area 14.

When the power interruption occurs after the recording in the access indicator (step 302 in FIG. 5) is finished, the disc can be recognized as a finalized disc based on the information recorded in the indicator area 7 and the DMA1 area 11. Therefore, the disc can be normally bootable. Since the recording in the access indicator is performed immediately after the management information is recorded in the DMA1 area, no problem arises even if information is not recorded in any of the DMA2 area 12 through the DMA4 area 14.

Hereinafter, with reference to FIG. 6, a writing state of information when an accidental power interruption or the like occurs during the finalize processing according to this embodiment will be described in detail.

Figure 6:
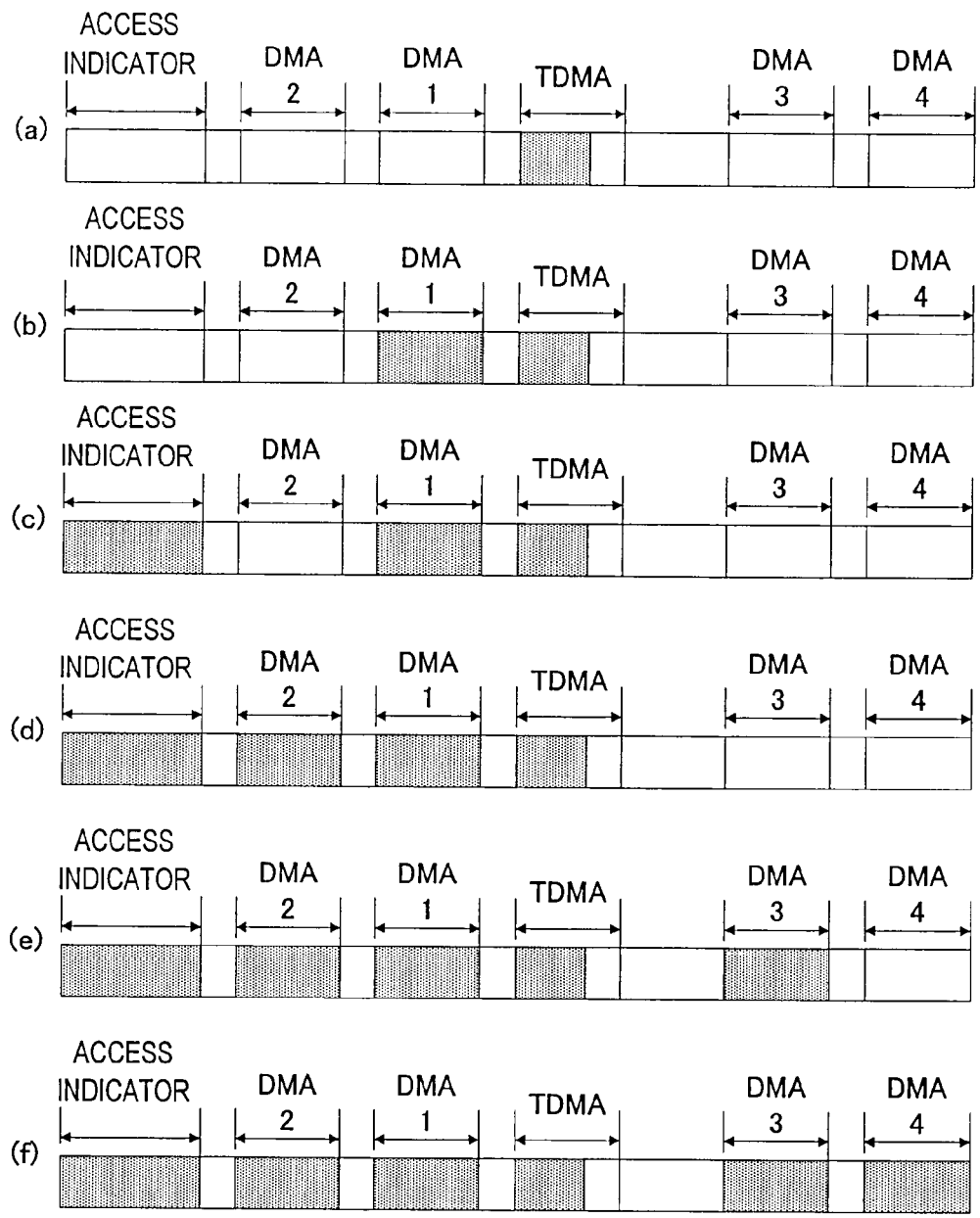
FIG. 6 shows a transition from non-recorded areas to recorded areas in an optical disc.

FIG. 6 shows a recording state of an optical disc finalized by the recording method shown in FIG. 5. (a) through (f) of FIG. 6, which respectively correspond to (a) through (f) of FIG. 5, show the state of the optical disc at the respective time.

First, a case in which a power interruption occurs during the execution of step 301 in FIG. 5 will be described as an example.

When a power interruption occurs during or immediately after the recording in the DMA1 area 11 (step 301), the optical disc 1 is in the state of (b) of FIG. 6, namely, no information is recorded in the access indicator and information is recorded in the DMA1 area 11.

Figure 7:
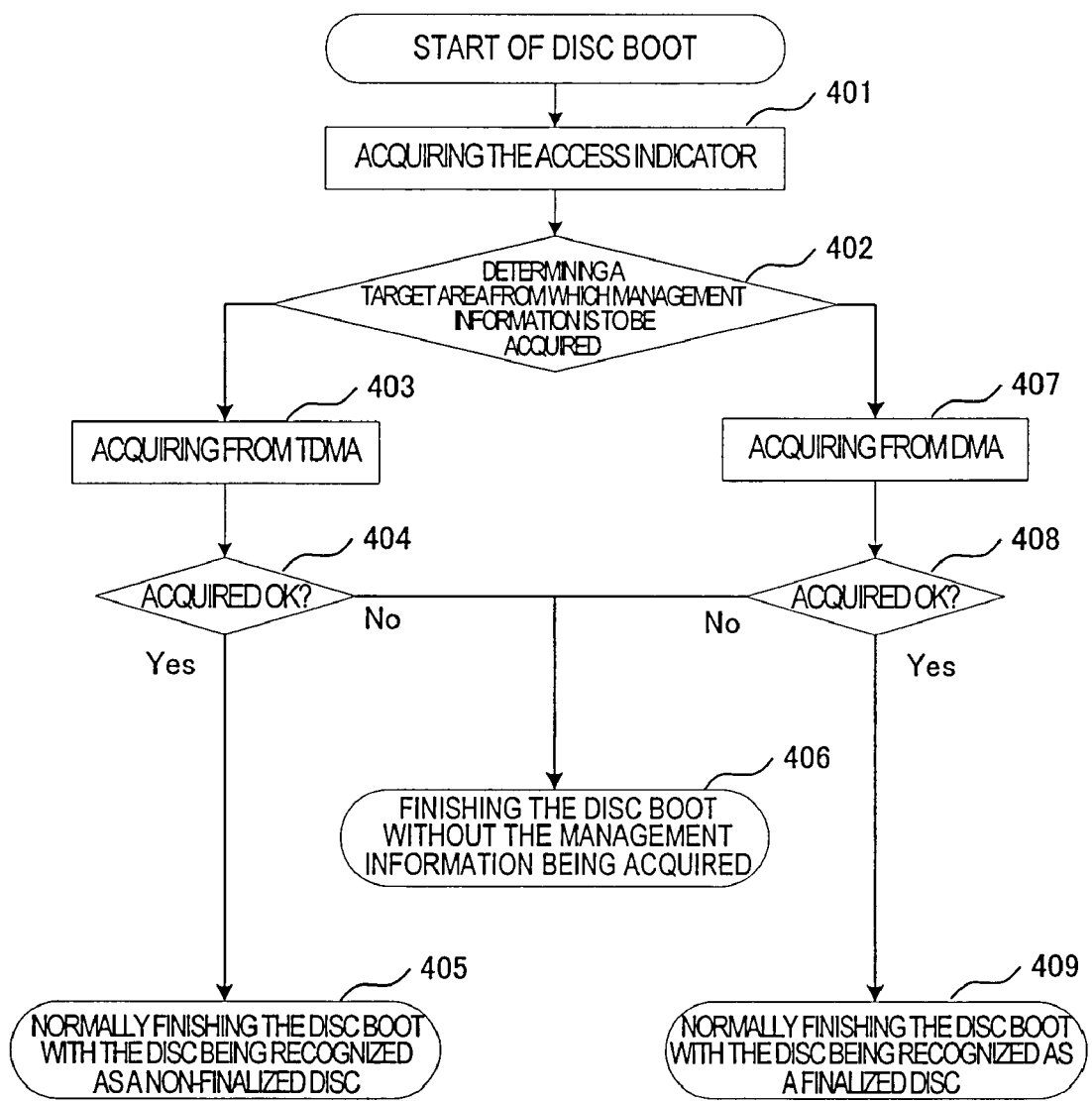
FIG. 7 is a flowchart showing an example of a procedure of management information acquisition processing of the background art.

FIG. 7 is a flowchart showing a procedure of booting such an optical disc and reproducing information.

The indicator reading section 161 acquires the access indicator (step 401). Since the DMA recorded-state information 15 is not recorded in the access indicator, it is determined that a target area from which management information is to be acquired is the TDMA area 10 (step 402).

The acquisition processing control section 166 causes the management information reading section 163 to acquire the management information from the TDMA area 10 (step 403). The latest management information is acquired from the TDMA area 10, and the booting of the optical disc is completed with the disc being recognized as a non-finalized disc (step 405).

When the upper-level apparatus issues a finalize instruction again, the instruction processing section 110 receives the finalize instruction, and the management information processing section 160 starts the finalize processing.

In step 301, the management information is recorded in the DMA1 area 11 to overwrite the DMA1 area 11 partially or entirely. However, since the optical disc is a write once optical disc, the management information in the overwritten part is destroyed and is not reproduceable.

Then, the remaining steps 302 through 305 are executed to finish the finalize processing.

When this optical disc 1 is booted in the procedure shown in FIG. 7, i.e., the usual booting procedure of a write once disc, the following processing is executed. The indicator reading section 161 acquires the access indicator (step 401). Since the DMA recorded-state information 15 is recorded, it is determined that a target area from which management information is to be acquired is the DMA area (step 402).

The acquisition processing control section 166 causes the management information reading section 163 to acquire the management information from the DMA area (step 407).

The management information reading section 163 acquires the management information from the DMA1 area 11 (step 407). In the case where only a part of the DMA1 area 11 is overwritten in step 301, the DDS 17 and the DFL 18 are successfully acquired from the remaining part of the DMA1 area 11. When the management information is successfully acquired from the DMA1 area 11, the booting of the disc is normally finished with the disc being recognized as a finalized disc (step 409).

By contrast, in the case where the DMA1 area 11 is entirely overwritten in step 301, neither the DDS 17 nor the DFL 18 is successfully acquired from the DMA1 area 11. Therefore, the management information is acquired from the DMA2 area 12. In the case where the DDS 17 and the DFL 18 are successfully recorded in the DMA2 area 12 in step 303, the management information is successfully acquired. Since the management information is successfully acquired from the DMA2 area 12, the booting of the disc is normally finished with the disc being recognized as a finalized disc (step 409).

In this manner, even when an accidental power interruption occurs during the finalize processing, especially before the management information is recorded in the DMA2 area, the optical disc can be normally booted as a non-finalized disc and then normally finalized.

Now, a case in which a power interruption occurs during or after step 302 will be described.

When a power interruption occurs during or after the recording in the indicator area 7 (steps 302 through 305), the optical disc 1 is in the state of any of (c) through (f) of FIG. 6.

A case in which this optical disc 1 is booted in the procedure shown in FIG. 7 will be described.

The indicator reading section 161 acquires the access indicator (step 401). Since the DMA recorded-state information 15 is recorded in the access indicator, it is determined that a target area from which management information is to be acquired is the DMA area (step 402).

The acquisition processing control section 166 causes the management information reading section 163 to acquire the management information from the DMA area (step 407).

The management information reading section 163 acquires the management information from the DMA1 area 11. Since the DDS 17 and the DFL 18 are normally recorded in the DMA1 area 11, the management information is successfully acquired. Since the management information is successfully acquired from the DMA1 area 11, the booting of the disc is normally finished with the disc being recognized as a finalized disc (step 409).

In this manner, even when an accidental power interruption or the like occurs during the finalize processing, an optical disc which can be normally booted as a finalized disc can be created.

As described above, according to this embodiment, the recording in the access indicator is executed after the recording in the DMA1 area is finished but before the recording in the DMA2 area is started. Thus, even when the finalize processing is discontinued at any stage due to an accidental power interruption or the like, a disc in the state of being normally bootable as a finalized disc or in the state of being normally bootable as a non-finalized disc so as to be normally re-finalized can be created.

According to the management information update method and the recording apparatus of the present invention, the recording in the access indicator (step 302) is executed after the DFL 18 and the DDS 17 are recorded in the DMA1 area 11 (step 301). Hence, even when the recording of the DFL 18 in the DMA1 area 11 is failed and the DFL recording position information 20 of the DDS 17 is changed, the same content of information can be recorded in the access indicator. Therefore, creation of an optical disc not conformed to the format with low reproduction compatibility can be avoided.

In the above, the management information update method according to this embodiment has been described with reference to FIG. 4 through FIG. 6.

In the management information update method according to Embodiment 1 shown in FIG. 5, the step of performing recording in the access indicator (step 302) is executed between the step of recording the management information in the DMA1 area (step 301) and the step of recording the management information in the DMA2 area (step 303).

However, the management information update method according to the present invention is not limited to the embodiment shown in FIG. 5.

For example, the step of performing recording in the access indicator (step 302) may be executed between the step of recording the management information in the DMA2 area (step 303) and the step of recording the management information in the DMA3 area (step 304).

For example, the step of performing recording in the access indicator (step 302) may be executed between the step of recording the management information in the DMA3 area 13 (step 304) and the step of recording the management information in the DMA4 area 14 (step 305).

After which step the recording in the access indicator (step 302) is to be executed may be determined based on a result of examination performed after the recording in the DMA areas.

The management information update method may be performed as follows. When the recording in the DMA1 area 11 (step 301) is determined as being failed, the recording in the DMA2 area 12 (step 303) is performed. When the recording in the DMA2 area 12 (step 303) is determined as being successful, the management information is recorded in the access indicator area 7 (step 302).

According to this embodiment, for example, after data is written in the user data area, recording of the management information in the DMA1 area, recording of the access indicator 7a in the indicator area 7, and recording of the management information in the DMA2 area are sequentially performed. Such recording is performed sequentially from an inner position toward an outer position of the recording medium. Accordingly, the optical head is allowed to constantly seek in the same direction (for example, inward or outward), which can shorten the seek time and so the time required until the recording is completed.

(Embodiment 2)

In this embodiment, for example, an apparatus and method for reading management information from an optical disc in a state not conformed to the format with low reproduction compatibility mentioned above regarding the background art will be described. For example, a reproduction apparatus according to this embodiment implements such processing by executing a procedure shown in steps 603 and 604 in FIG. 13 in FIG. 14 described later. Hereinafter, a structure and operation of the reproduction apparatus according to this embodiment will be described.

2-1. Write Once Recording Medium

A write once recording medium according to this embodiment has the same structure as that of the optical disc 1 in Embodiment 1, and the description of the structure will be omitted here.

2-2. Reproduction Apparatus

Figure 12:
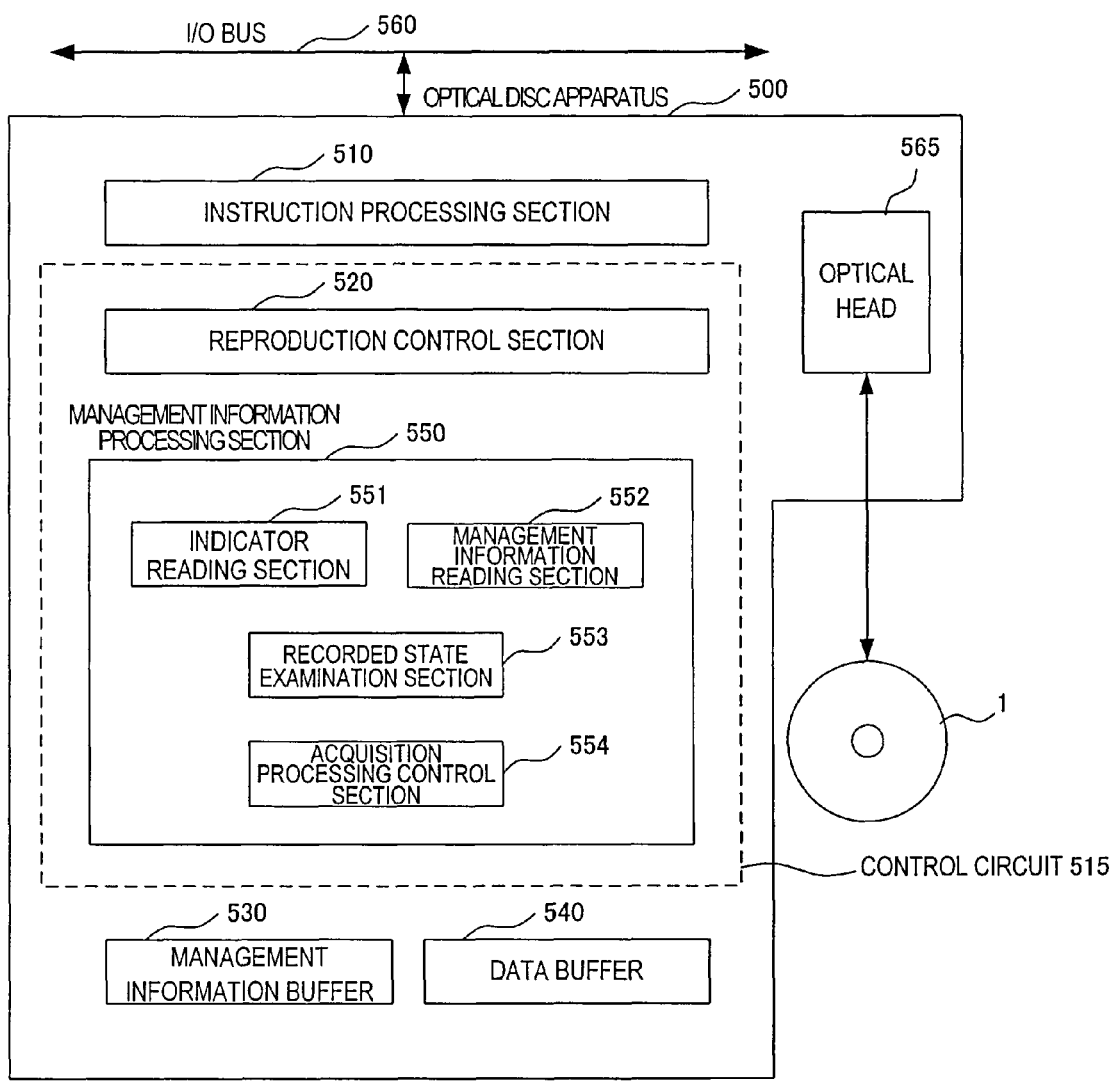
FIG. 12 shows a structure of an optical disc apparatus according to Embodiment 2 of the present invention.

FIG. 12 shows a structure of an optical disc apparatus 500 according to this embodiment.

The optical disc apparatus 500 is connected to an I/O bus 560, which is connected to an upper-level apparatus (not shown). The upper-level apparatus is typically a host computer.

The optical disc apparatus 500 is structured such that the optical disc 1 is mountable thereon. The optical disc apparatus 500 includes an instruction processing section 510, a control circuit 515, a management information buffer 530, a data buffer 540, and an optical head 565.

The instruction processing section 510 processes an instruction from the upper-level apparatus. The management information buffer 530 stores management information. The data buffer 540 temporarily stores reproduction data.

The control circuit 515 executes processing based on the instruction processed by the instruction processing section 510. For example, the control circuit 515 follows a reproduction instruction from the upper-level apparatus to drive the optical head 565 and thus to reproduce information from the optical disc 1.

The control circuit 515 executes various processing in accordance with instructions from the upper-level apparatus. This is realized by the control circuit 515 executing various computer programs pre-stored therein, like the control circuit 115 shown in FIG. 3. The control circuit 515 is one circuit as viewed as hardware, but behaves like various different elements by executing different computer programs.

In this embodiment also, the control circuit 515 is described as including various elements for executing main processing, for the simplicity of explanation. Specifically, the various elements are a reproduction control section 520 for controlling the reproduction of information from the optical disc 1 and management information processing section 550 for performing processing regarding management information.

The management information processing section 550 can be considered as including more detailed elements each provided for a function. Specifically, the management information processing section 550 includes an indicator reading section 551, a management information reading section 552, a recorded state examination section 553, and an acquisition processing control section 554 for controlling management information acquisition processing.

The indicator reading section 551 reads the DMA recorded-state information 15 and the TDMA recorded-state information 16 from the indicator area 7.

The management information reading section 552 reads management information from the DMA1 area 11 through the DMA4 area 14 and the TDMA area 10 and stores the management information in the management information storage buffer 530.

The recorded state examination section 553 checks whether or not the DMA1 area 11 through the DMA4 area 14 are in a recorded state.

2-3. Management Information Acquisition Method

Hereinafter, a method for acquiring management information from the optical disc 1 according to this embodiment will be described.

Figure 13:
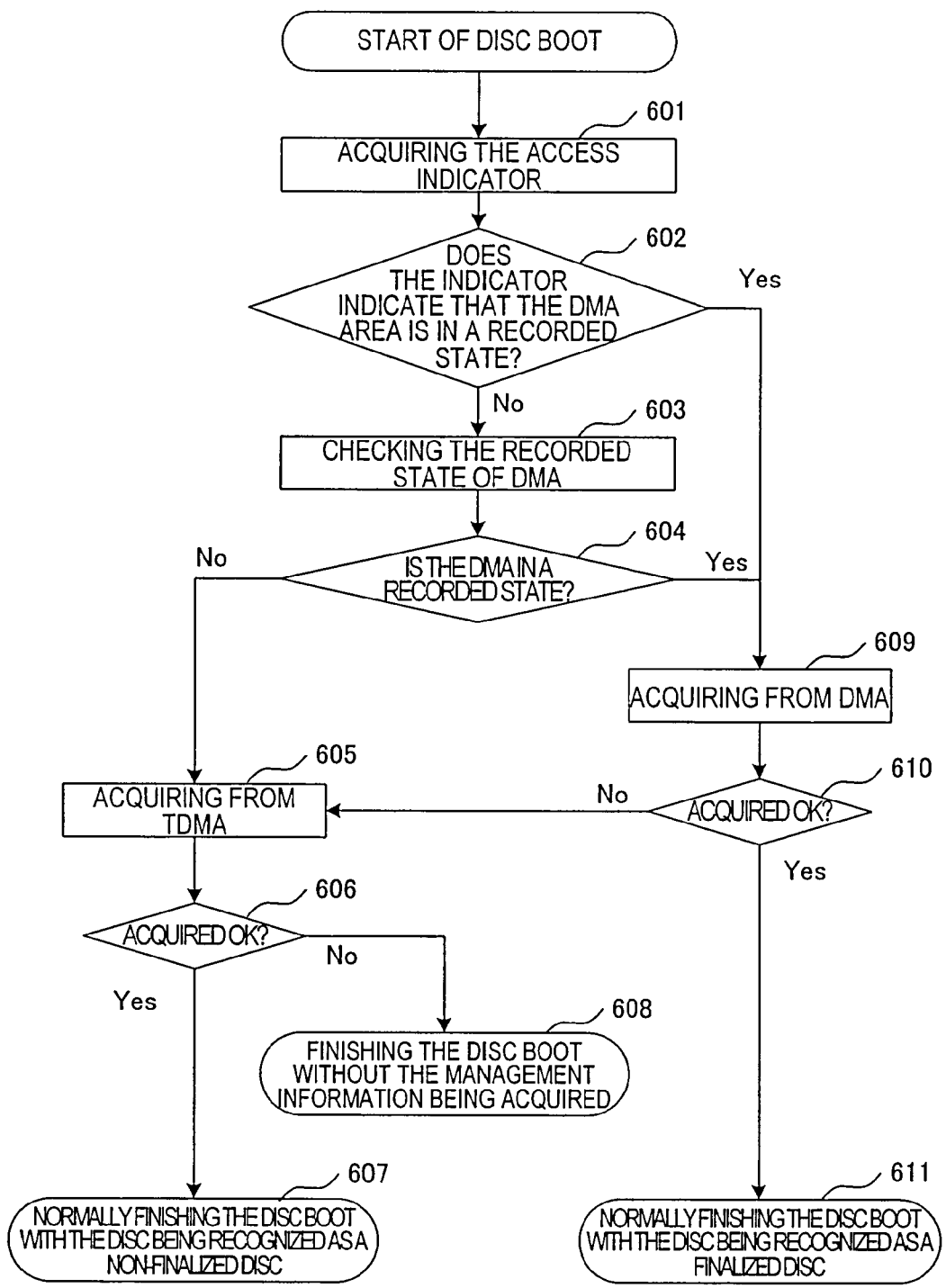
FIG. 13 is a flowchart showing a procedure of management information acquisition processing according to Embodiment 2 of the present invention.

FIG. 13 is a flowchart showing a procedure of management information acquisition processing according to this embodiment. In this embodiment, processing of checking whether or not effective information is recorded in the DMA area is executed.

Hereinafter, with reference to FIG. 12 and FIG. 13, the procedure of management information acquisition processing according to this embodiment will be described regarding each step.

The acquisition processing control section 554 causes the indicator reading section 551, the management information reading section 552 and the recorded state examination section 553 to execute the management information acquisition processing in the procedure shown in FIG. 13.

In step 601, the acquisition processing control section 554 causes the indicator reading section 551 to acquire the DMA recorded-state information 15 and the TDMA recorded-state information 16 from the access indicator.

In step 602, the acquisition processing control section 554 determines whether or not the DMA area is in a recorded state based on the result of acquisition from the access indicator. When the DMA recorded-state information 15 is recorded (Yes), the acquisition processing advances to step 609. When the DMA recorded-state information 15 is not recorded (No), the acquisition processing advances to step 603.

In step 603, the acquisition processing control section 554 causes the recorded state examination section 553 to check whether or not the DMA area is in a recorded state.

In step 604, when the DMA area is in a recorded state (Yes), the acquisition processing advances to step 609. When the DMA area is in a non-recorded state (No), the acquisition processing advances to step 605.

In step 605, the acquisition processing control section 554 instructs the management information reading section 552 to acquire management information from the TDMA area 10.

In step 606, when the management information can be acquired from the TDMA area 10 (Yes), the acquisition processing advances to step 607. When the management information cannot be acquired from the TDMA area 10 (No), the acquisition processing advances to step 608.

In step 607, since the management information can be acquired from the TDMA area 10, the acquisition processing is normally finished. In this case, the optical disc 1 is determined as a non-finalized disc.

In step 608, the acquisition processing is finished without the management information being acquired. In this case, the optical disc 1 is determined as an abnormal disc.

In step 609, the acquisition processing control section 554 instructs management information reading section 552 to acquire the management information from the DMA area.

In step 610, when the management information can be acquired from the DMA area (Yes), the acquisition processing advances to step 611. When the management information cannot be acquired from the DMA area (No), the acquisition processing advances to step 605, and the acquisition processing control section 554 causes the management information reading section 552 to acquire the management information from the TDMA area 10.

In step 611, since the management information can be acquired from the DMA area, the acquisition processing is normally finished. In this case, the optical disc is determined as a finalized disc.

For acquiring the management information from the DMA area (step 609), the management information acquisition processing may be executed as follows. Based on the result of checking whether or not the DMA area is in a recorded state (step 603), the management information is acquired only from a DMA area which is confirmed to be in a recorded state, whereas the management information is not acquired from a DMA area which is confirmed to be in a non-recorded state.

Figure 14:
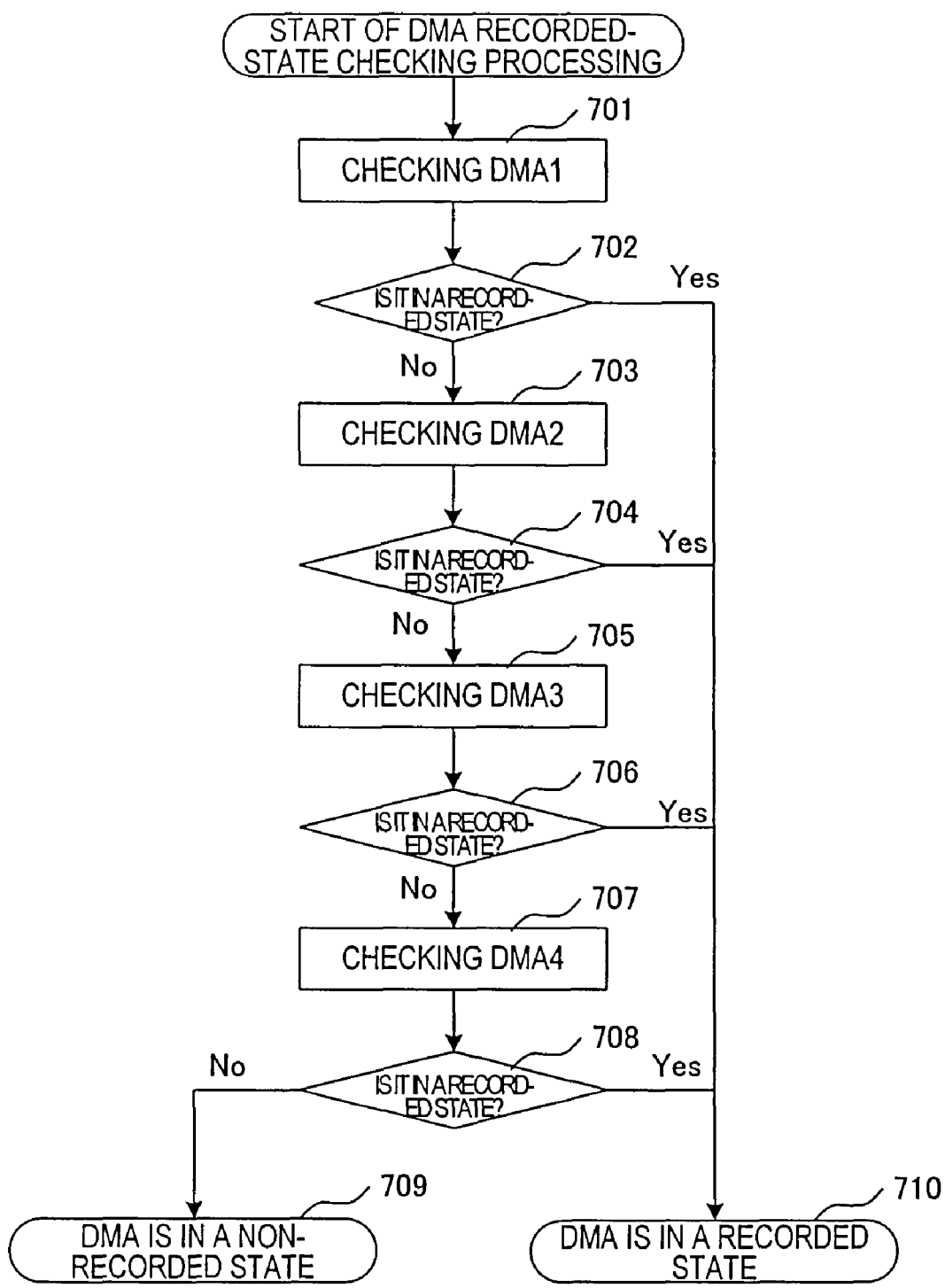
FIG. 14 is a flowchart showing a procedure of DMA recorded-state checking processing according to Embodiment 2 of the present invention.

FIG. 14 shows a flowchart showing a detailed procedure of recorded state checking processing on the DMA area (step 603 in FIG. 13) according to this embodiment.

Hereinafter, with reference to FIG. 12 and FIG. 14, the procedure of the recorded state checking processing on the DMA area according to this embodiment will be described regarding each step.

The acquisition processing control section 554 causes the recorded state examination section 553 to check whether or not the DMA areas are in a recorded state in the procedure shown in steps 701 through 710.

In step 701, the acquisition processing control section 554 causes the recorded state examination section 553 to check whether or not the DMA1 area 11 is in a recorded state.

In step 702, when the DMA1 area 11 is in a recorded state (Yes), the processing advances to step 710. When the DMA1 area 11 is in a non-recorded state (No), the processing advances to step 703.

In step 703, the acquisition processing control section 554 causes the recorded state examination section 553 to check whether or not the DMA2 area 12 is in a recorded state.

In step 704, when the DMA2 area 12 is in a recorded state (Yes), the processing advances to step 710. When the DMA2 area 12 is in a non-recorded state (No), the processing advances to step 705.

In step 705, the acquisition processing control section 554 causes the recorded state examination section 553 to check whether or not the DMA3 area 13 is in a recorded state.

In step 706, when the DMA3 area 13 is in a recorded state (Yes), the processing advances to step 710. When the DMA3 area 13 is in a non-recorded state (No), the processing advances to step 707.

In step 707, the acquisition processing control section 554 causes the recorded state examination section 553 to check whether or not the DMA4 area 14 is in a recorded state.

In step 708, when the DMA4 area 14 is in a recorded state (Yes), the processing advances to step 710. When the DMA4 area 14 is in a non-recorded state (No), the processing advances to step 709.

In step 709, the DMA area is determined as being in a non-recorded state.

In step 710, the DMA area is determined as being in a recorded state.

The management information acquisition processing is executed in the above-described procedure. When the DMA recorded-state information 15 is not recorded, it is determined whether or not the DMA area is in a recorded state. Therefore, even when an optical disc which has no access indicator recorded due to an accidental power interruption or the like occurring during the finalize processing is booted, management information can be acquired from the DMA area.

Figure 8:
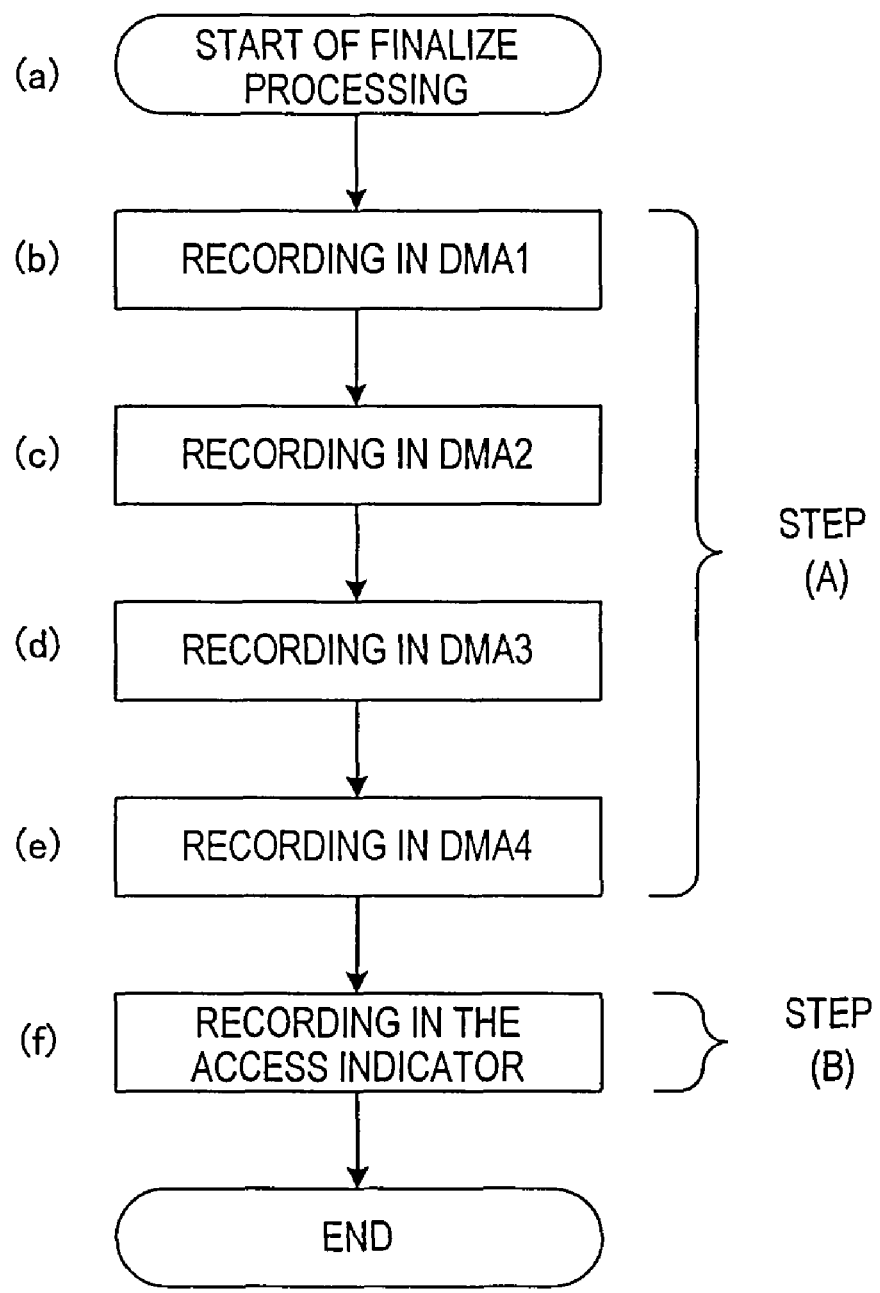
FIG. 8 is a flowchart showing an example of a procedure of finalize processing of the background art.
Figure 9:
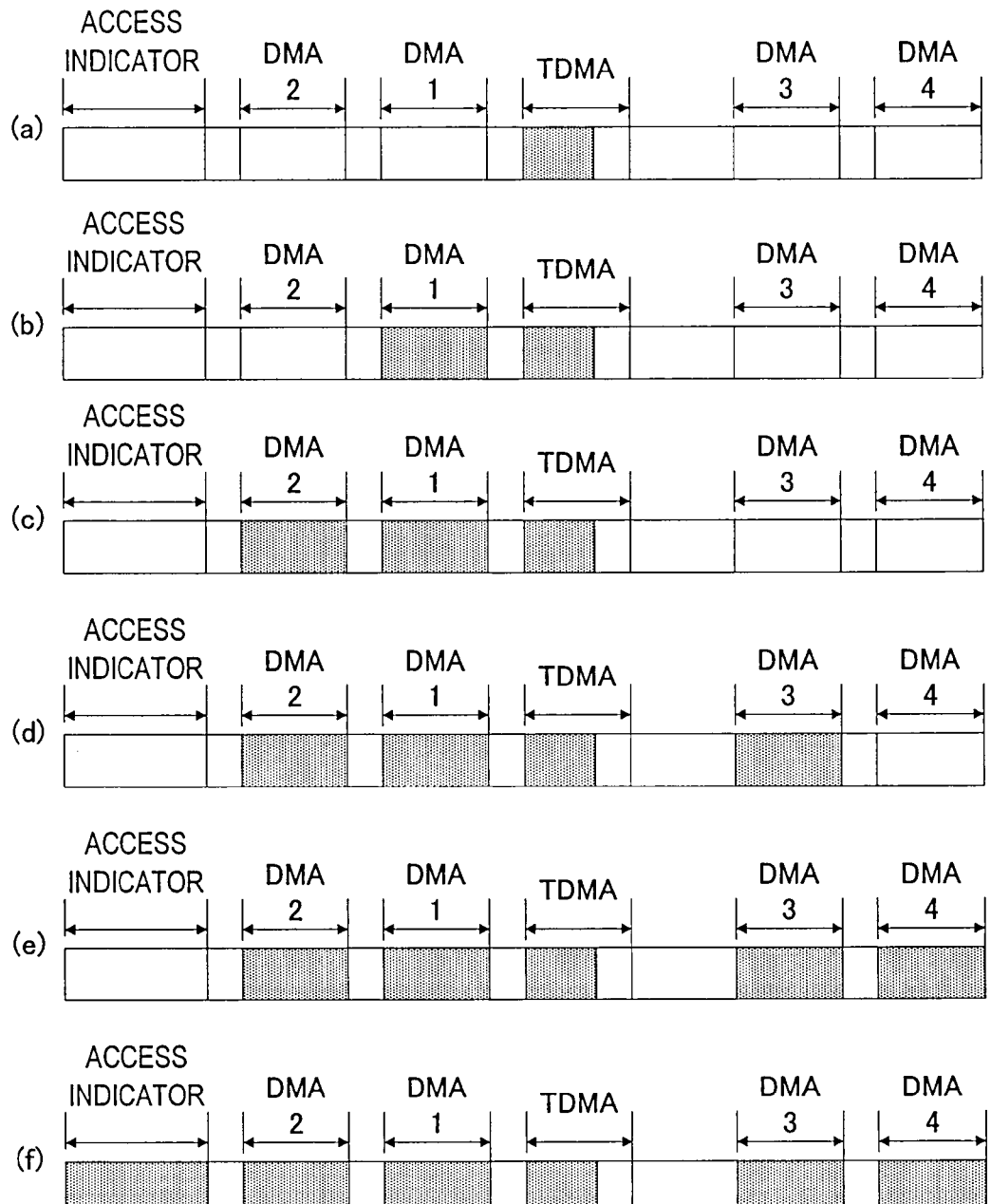
FIG. 9 shows a transition from non-recorded areas to recorded areas in an optical disc.
Figure 10:
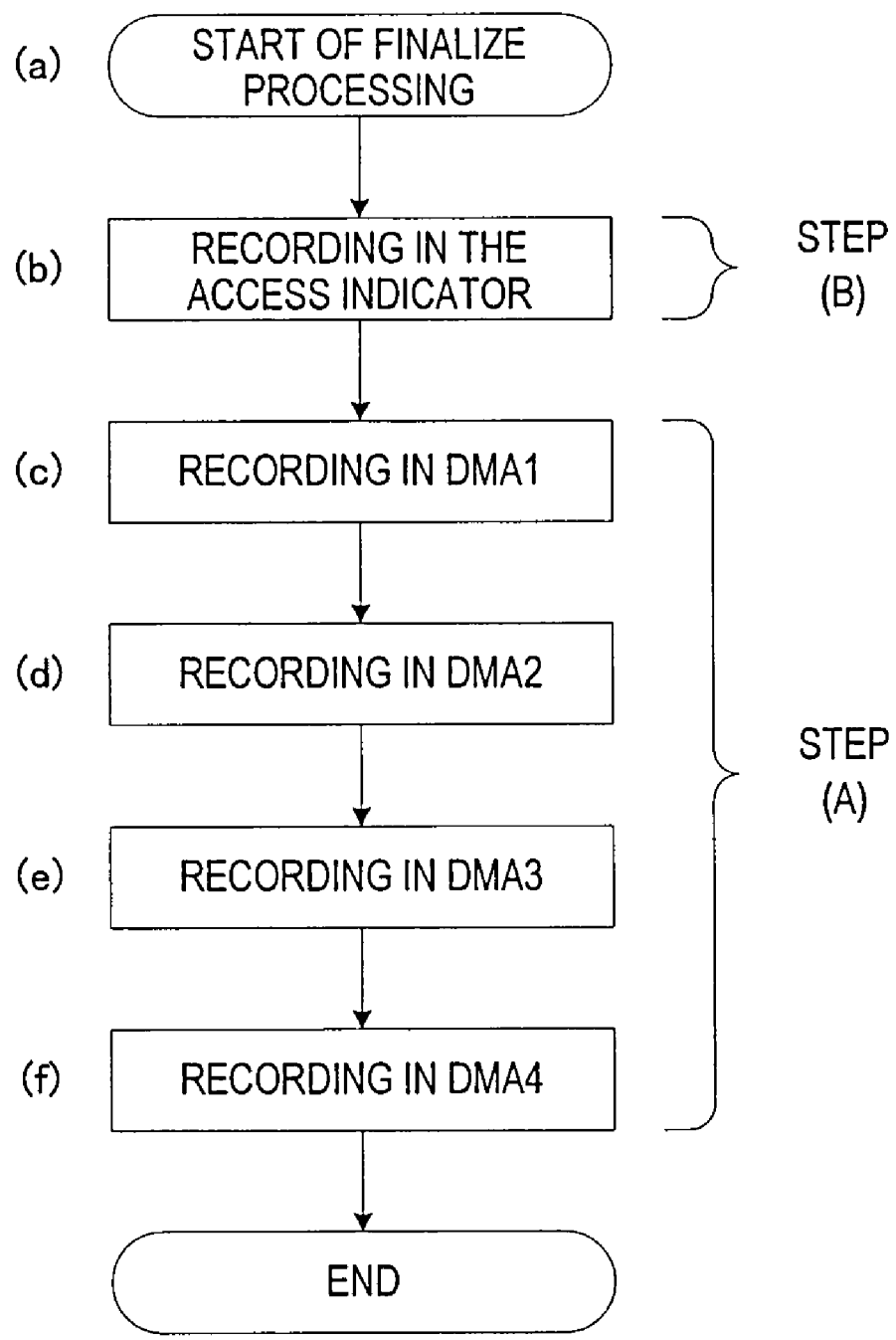
FIG. 10 is a flowchart showing an example of a procedure of finalize processing of the background art.
Figure 11:
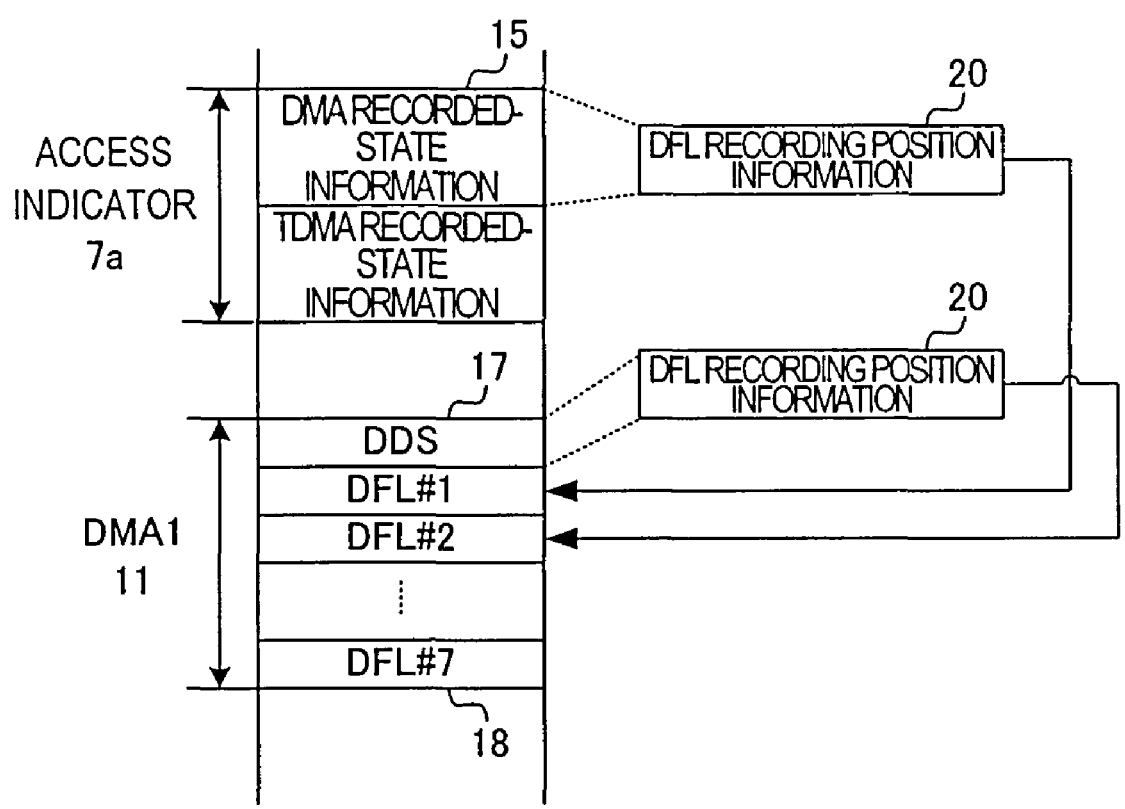
FIG. 11 shows an example of difference in DFL recording position information between the indicator information and the DDS.

Hereinafter, with reference to FIG. 13, a case in which an optical disc subjected to a power interruption during the finalize processing performed in the procedure shown in FIG. 8 is booted will be described.

In the following example, a power interruption occurs during the recording of management information in the DMA1 area 11, and as a result, neither the DDS 17 nor the DFL 18 is recorded in the DMA1 area 11.

When this optical disc 1 is booted, it is found that the DMA recorded-state information 15 is not recorded in the access indicator. Therefore, the optical disc apparatus checks whether or not the DMA area is in a recorded state (step 603). Since a part of the DMA1 area 11 is in a recorded state, the optical disc apparatus determines that the DMA area is in a recorded state and acquires management information from the DMA area (step 609). Since neither the DDS 17 nor the DFL 18 is recorded in the DMA area, the acquisition of the management information from the DMA area is failed. The optical disc apparatus acquires the management information from the TDMA area 10 (step 605). After acquiring the management information from the TDMA area 10, the optical disc apparatus determines that the optical disc is a non-finalized disc and finishes the acquisition processing (step 607).

The DMA1 area 11 may be set to be determined as being in a non-recorded area unless being in a recorded state entirely. In this case, the DMA area is determined as being in a non-recorded state, and the management information is acquired from the TDMA area 10 (step 605).

Now, a case in which a power interruption occurs after the recording in the DMA1 area 11 is completed will be described.

When this optical disc 1 is booted, it is found that the DMA recorded-state information 15 is not recorded in the access indicator. Therefore, the optical disc apparatus checks whether or not the DMA area is in a recorded state (step 603). Since the DMA1 area 11 is in a recorded state, the optical disc apparatus determines that the DMA area is in a recorded state and acquires management information from the DMA area (step 609). Since the DDS 17 and the DFL 18 are recorded in the DMA1 area 11, the management information is successfully acquired from the DMA area. The optical disc is determined as a finalized disc, and the acquisition processing is finished (step 611).

As described above, according to this embodiment, it is checked whether or not the DMA area is in a recorded state. Therefore, even if the DMA recorded-state information 15 is not recorded, as long as the DMA area is in a recorded state, management information is acquired from the DMA area and the optical disc can be booted as a finalized disc. In the case where the DMA area is in a non-recorded state, the management information is acquired from the TDMA area, and the optical disc can be booted as a non-finalized disc and then normally re-finalized.

(Embodiment 3)

In this embodiment, for example, an apparatus and method for reading management information from an optical disc not conformed to the format with low reproduction compatibility mentioned above regarding the background art will be described. A typical example of such an optical disc is as shown in (c) or (d) of FIG. 16. The reproduction apparatus executes the procedure shown in FIG. 15 to implement such processing. Hereinafter, a structure and operation of the reproduction apparatus according to this embodiment will be described.

3-1. Write Once Recording Medium

A write once recording medium according to this embodiment is the same as that of Embodiment 1 except for the indicator area 7 and the TDMA area 10. Hence, in the following, the indicator area 7 and the TDMA area 10 will be described in detail and descriptions of the other elements will be omitted.

Figure 17:
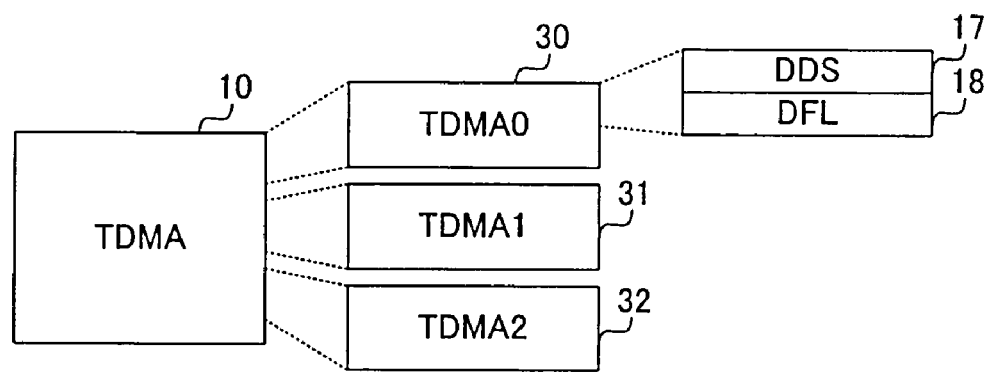
FIG. 17 shows a data structure of the TDMA area according to Embodiment 3 of the present invention.

FIG. 17 shows an example of a data structure of a TDMA area 10 according to this embodiment. The TDMA area 10 includes a plurality of areas (for example, a TDMA0 area 30, a TDMA1 area 31 and a TDMA2 area 32). In the TDMA area 10, the latest DDS 17 and DFL 18 as the management information are recorded in the order from the TDMA0 area 30 to the TDMA1 area 31 and to the TDMA2 area 32, from the leading end of the TDMA0 area 30.

Figure 18:
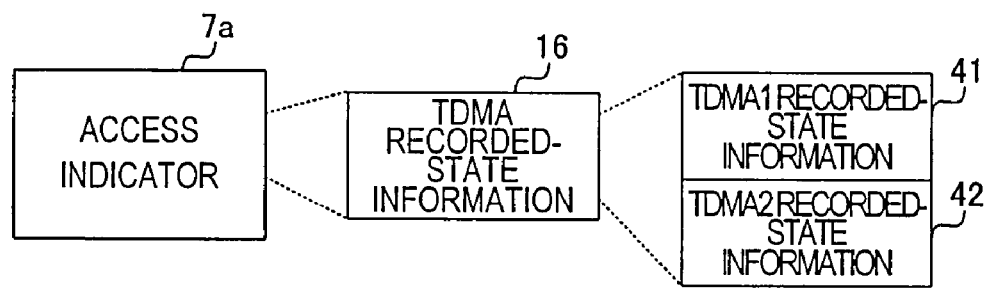
FIG. 18 shows a data structure of the access indicator area according to Embodiment 3 of the present invention.

FIG. 18 shows an example of a data structure of an access indicator according to this embodiment. In the TDMA recorded-state information 16, TDMA1 recorded-state information 41 and TDMA2 recorded-state information 42 are recorded. For example, when the TDMA1 recorded-state information 41 is recorded, this means that the latest management information is recorded in the TDMA1 area 31.

3-2. Reproduction Apparatus

An optical disc reproduction apparatus according to this embodiment is substantially the same as that of Embodiment 2 and the description thereof will be omitted here.

3-3. Management Information Acquisition Method

Figure 15:
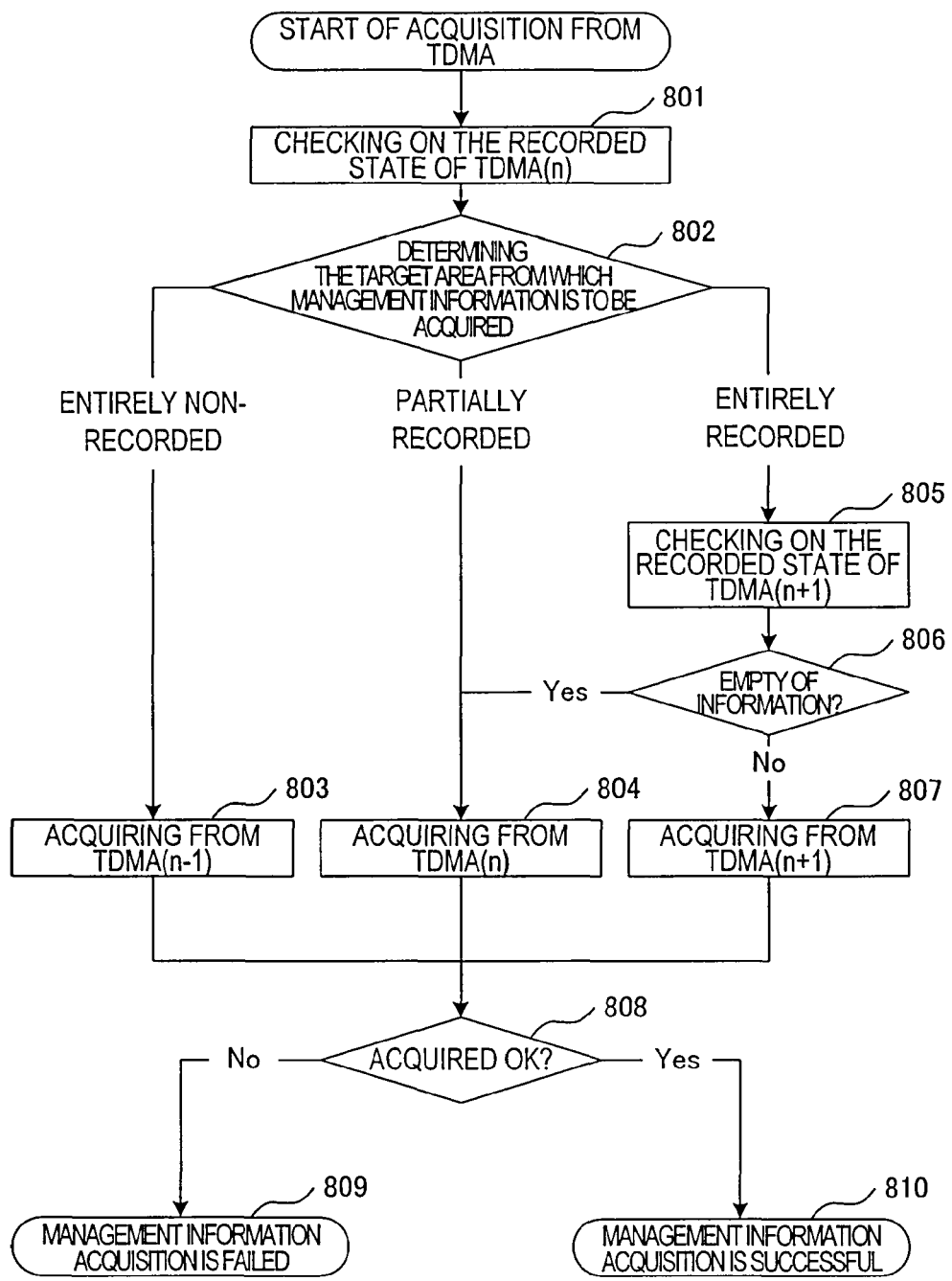
FIG. 15 is a flowchart showing a procedure of management information acquisition processing according to Embodiment 3 of the present invention.

FIG. 15 is a flowchart showing a procedure of management information acquisition processing. This processing is executed by the reproduction apparatus according to this embodiment. In this embodiment, processing of checking whether or not effective information is recorded in the TDMA is executed.

Hereinafter, with reference to FIG. 12 and FIG. 15, the procedure of management information acquisition processing according to this embodiment will be described regarding each step.

The acquisition processing control section 554 causes the indicator reading section 551, the management information reading section 552 and the recorded state examination section 553 to execute the management information acquisition processing from the TDMA 10 in the procedure shown in FIG. 15.

The acquisition processing control section 554 causes the indicator reading section 551 to acquire the TDMA recorded-state information 16 from the access indicator and determines a target area in the TDMA area 10 from which management information is to be acquired.

In step 801, when the target area in the TDMA area 10 from which management information is to be acquired is determined as a TDMA(n) area, the acquisition processing control section 554 causes the recorded state examination section 553 to execute the recorded state checking on the TDMA(n) area.

In step 802, based on the result of the recorded state checking on the TDMA(n) area, the acquisition processing control section 554 determines a target area in the TDMA area 10 from which the management information is to be acquired. When the TDMA(n) area is entirely in a non-recorded state, the acquisition processing advances to step 803. When the TDMA(n) area is only partially in a recorded state, the acquisition processing advances to step 804. When the TDMA(n) area is entirely in a recorded state, the acquisition processing advances to step 805.

In step 805, the acquisition processing control section 554 causes the recorded state examination section 553 to execute the recorded state checking on a TDMA(n+1) area.

In step 806, when the TDMA(n+1) area is in a non-recorded area (Yes), the acquisition processing advances to step 804. When the TDMA(n+1) area is in a recorded area (No), the acquisition processing advances to step 807.

In step 803, the acquisition processing control section 554 instructs the management information reading section 552 to acquire the management information from a TDMA(n−1) area.

In step 804, the acquisition processing control section 554 instructs the management information reading section 552 to acquire the management information from the TDMA(n) area.

In step 807, the acquisition processing control section 554 instructs the management information reading section 552 to acquire the management information from the TDMA(n+1) area.

In step 808, when the management information cannot be acquired (No), the acquisition processing is failed (step 809). When the management information can be acquired (Yes), the acquisition processing is successful (step 810).

When the management information cannot be acquired from the target area for management information acquisition determined in step 802, the acquisition processing from another area may be performed. For example, when the acquisition from the TDMA(n) area is failed, the management information may be acquired from the TDMA(n−1) area.

The management information acquisition processing from the TDMA area 10 is executed in the above-described procedure. It is checked whether or not the target TDMA area from which the management information is to be acquired is in a recorded state or not. Therefore, the latest management information can be normally acquired even from an optical disc which does not have an accurate content of the TDMA recorded-state information 16 due to a power interruption or the like occurring during the management information update in the TDMA area 10 and the indicator area 7.

Hereinafter, with reference to FIG. 15 and FIG. 16, a case in which an optical disc which does not have an accurate content of the TDMA recorded-state information 16 is booted for reproduction will be described.

Figure 16:
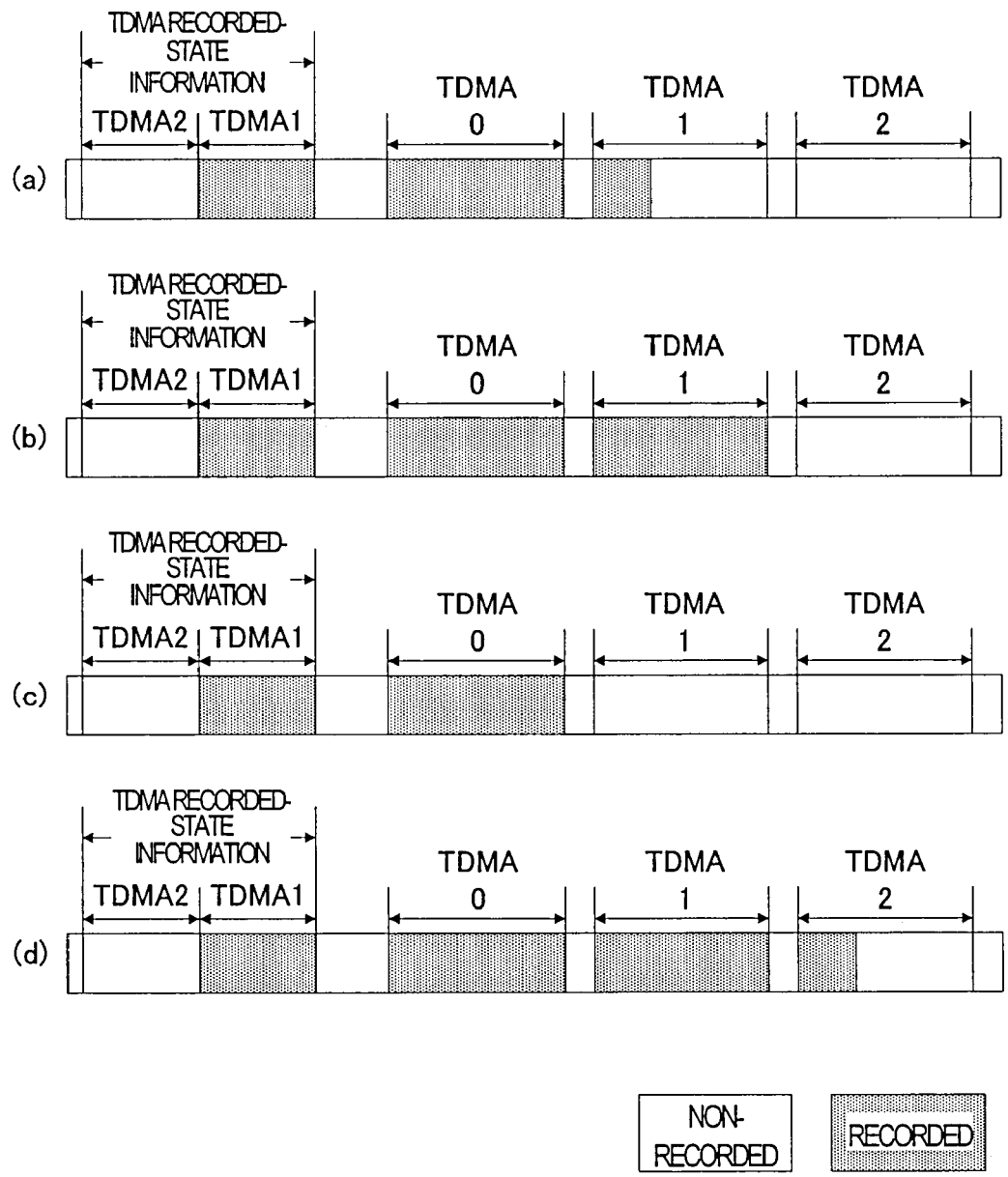
FIG. 16 shows a recording state of an access indicator area and a TDMA area.

FIG. 16 shows a recording state of the indicator area 7 and the TDMA area 10. In this state, the TDMA recorded-state information 16 in the indicator area 7 indicates that the TDMA1 area 31 is in a recorded state whereas the TDMA2 area 32 is in a non-recorded state. In this case, the recording state of the TDMA area 10 may be any of (a) through (c) of FIG. 16.

Where the TDMA area 10 is in the state of (a), the TDMA0 area 30 is entirely in a recorded state, the TDMA1 area 31 is partially in a recorded state, and the TDMA2 area 32 is entirely in a non-recorded state. This is a normal recording state with the latest management information being recorded in the TDMA1 area 31.

Where the TDMA area 10 is in the state of (b), the TDMA0 area 30 and the TDMA1 area 31 are entirely in a recorded state, and the TDMA2 area 32 is entirely in a non-recorded state. This is a normal recording state with the latest management information being recorded at the trailing end of the TDMA1 area 31.

Where the TDMA area 10 is in the state of (c), the TDMA0 area 30 is entirely in a recorded state, and the TDMA1 area 31 and the TDMA2 area 32 are entirely in a non-recorded state. This recording state occurs when, for example, the recording in the indicator 7 is performed before the recording in the TDMA1 area 31 is performed, and immediately after that, a power interruption occurs.

Where the TDMA area 10 is in the state of (d), the TDMA0 area 30 and the TDMA1 area 31 are entirely in a recorded state, and the TDMA2 area 32 is partially in a recorded state. This recording state occurs when, for example, the recording in the TDMA2 area 32 is performed before the recording in the indicator 7 is performed, and immediately after that, a power interruption occurs.

According to the management information acquisition procedure in this embodiment, it is checked whether or not the target TDMA area from which the management information is to be acquired is in a recorded state. Therefore, the management information can be normally acquired even from an optical disc in the state of (c) or (d) of FIG. 16 due to a power interruption occurring during the management information update.

A case in which management information is acquired from an optical disc in the state of (c) of FIG. 16 will be described.

The TDMA recorded-state information 16 indicates that the TDMA1 area 31 is in a recorded state. Therefore, the recorded state checking on the TDMA1 area 31 is executed (step 801). Since the TDMA1 area 31 is entirely in a non-recorded state, the target area from which management information is to be acquired is determined as the TDMA0 area 30 (step 802). The management information is acquired from the TDMA0 area 30 (step 803). Since the latest management information is recorded in the TDMA0 area 30, the management information acquisition processing is finished as being successful (step 810).

Now, a case in which management information is acquired from an optical disc in the state of (d) of FIG. 16 will be described.

The TDMA recorded-state information 16 indicates that the TDMA1 area 31 is in a recorded state. Therefore, the recorded state checking on the TDMA1 area 31 is executed (step 801). Since the TDMA1 area 31 is entirely in a recorded state, it is checked whether or not the TDMA2 area 32 is in a recorded state (step 805). Since the TDMA2 area 32 is in a recorded state, management information is acquired from the TDMA2 area 32 (step 807). Since the latest management information is recorded in the TDMA2 area 32, the management information acquisition processing is finished as being successful (step 810).

When the TDMA1 area 31 is entirely in a recorded state, the management information acquisition processing from the TDMA2 area 32 may be executed after the management information is acquired from the trailing end of the TDMA1 area 31.

As described above, according to this embodiment, management information can be normally acquired even from an optical disc in which the access indicator (area recorded-state information) does not indicate an accurate state due to a power interruption occurring during the management information update.

In the above embodiments, the various operations are described as being performed by execution of a computer program by the control circuit 115 or 515. Such a computer program is distributed on the market as being recorded on recording mediums exemplified by optical discs such as CD-ROM or the like, or semiconductor memories such as memory cards or the like; or is transferred via an electric communication line such as the Internet or the like.

The control circuit 115 or 515 may be implemented as hardware such as a DSP, a chip circuit, an optical disc controller or the like obtained by incorporating a program into a semiconductor circuit, or may be implemented by allowing a general purpose processor to execute a computer program expanded on a memory.

In, for example, FIG. 3, the control circuit 115 and the instruction processing section 110 are shown as separate elements. Alternatively, the function of the instruction processing section 110 may be incorporated into the control circuit 115. In this case, the function of the instruction processing section 110 may also be implemented by a computer program executed by the control circuit 115. This is also applicable to FIG. 12.

The present invention is described above by way of some preferable embodiments. The present invention is not intended to be construed as being limited to the above-described embodiments. It is appreciated that the scope of the present invention is construed only based on the claims. It will be apparent to those skilled in the art upon reading the preferable embodiments of the present invention that equivalent embodiments may be implemented based on the description of the present invention and the technological common knowledge. It is also appreciated that the contents of the patents, patent applications and documents cited herein are to be hereby incorporated by reference as being specifically described in this specification.

INDUSTRIAL APPLICABILITY

The present invention is useful for, for example, a case where important information needs to be accumulated in a severe environment with a high frequency of power interruption. For example, the present invention is useful for recording information on an optical disc in a laptop personal computer or any other device which is unlikely to obtain stable power and is likely to malfunction due to an applied impact.

The invention claimed is:

1. A recording apparatus for recording information on a write once recording medium sequentially including a user data area, a first management information area, an indicator area and a second management information area on a recording layer thereof, the recording apparatus comprising:
   an optical head; and
   a control section for instructing the optical head to record information;
   wherein the control section (a) instructs to record management information in the first management information area; after (a), (b) instructs to record indicator information indicating whether or not the management information has been recorded, in the indicator area; and, after (b), (c) instructs to record the same management information as recorded in the first management information area, in the second management information area.

2. The recording apparatus of claim 1, wherein:
   the write once recording medium further has a temporary management information area to which latest management information is recordable in an additive manner; and
   when executing finalize processing on the recording medium, the control section instructs to record the latest management information, recorded in the temporary management information area, in the first management information area and the second management information area.

3. The recording apparatus of claim 2, wherein the control section instructs to further record in the indicator area a part of the information which is to be recorded in the management information.

4. The recording apparatus of claim 2, wherein the control section instructs to further record in the indicator area, information indicating that the latest management information has been recorded in an additive manner in the temporary management information area.

5. The recording apparatus of claim 2, wherein the control section instructs to record user data in the user data area, and then executes the finalize processing.

6. A recording method for recording information on a write once recording medium sequentially including a user data area, a first management information area, an indicator area and a second management information area on a recording layer thereof, the recording method comprising the steps of:
   (a) recording management information in the first management information area;
   (b) after the step (a), recording indicator information indicating whether or not the management information has been recorded, in the indicator area; and (c) after the step (b), recording the same management information as recorded in the first management information area in the second management information area.

7. A control circuit incorporated into a recording apparatus including an optical head for instructing the optical head to record information on a write once recording medium, wherein the recording medium sequentially includes a user data area, a first management information area, an indicator area and a second management information area on a recording layer thereof, the control circuit comprising:

a recording control section for instructing the optical head to record management information; and a management information processing section for generating management information;

wherein the recording control section instructs the optical head to (a) record management information generated by the management information processing section in the first management information area; after (a), (b) to record indicator information indicating whether or not the management information has been recorded, in the indicator area; and, after (b), (c) to record the same management information as recorded in the first management information area in the second management information area.

* * * * *